(12) United States Patent
Edwards et al.

(10) Patent No.: US 12,459,202 B2
(45) Date of Patent: Nov. 4, 2025

(54) FLOW RATE CONTROL IN EXTRUSION DEPOSITION PROCESS

(71) Applicant: 3D Systems, Inc., Rock Hill, SC (US)

(72) Inventors: Andrew John Stewart Edwards, North Somerset (GB); Frank A. McKiel, Jr., Colorado Springs, CO (US)

(73) Assignee: 3D SYSTEMS, INC., Rock Hill, SC (US)

(*) Notice: Subject to any disclaimer, the term of this patent is extended or adjusted under 35 U.S.C. 154(b) by 0 days.

(21) Appl. No.: 19/020,228

(22) Filed: Jan. 14, 2025

(65) Prior Publication Data

US 2025/0236071 A1 Jul. 24, 2025

Related U.S. Application Data

(60) Provisional application No. 63/622,800, filed on Jan. 19, 2024.

(51) Int. Cl.
*B29C 64/343* (2017.01)
*B29C 64/393* (2017.01)
(Continued)

(52) U.S. Cl.
CPC .......... *B29C 64/343* (2017.08); *B29C 64/393* (2017.08); *B33Y 10/00* (2014.12); *B33Y 40/00* (2014.12); *B33Y 50/02* (2014.12)

(58) Field of Classification Search
CPC ..... B29C 64/343; B29C 64/393; B33Y 10/00; B33Y 40/00; B33Y 50/02
(Continued)

(56) References Cited

U.S. PATENT DOCUMENTS 5,303,141 A 4/1994 Batchleder et al.
9,174,388 B2 11/2015 Batchleder et al.
(Continued)

FOREIGN PATENT DOCUMENTS

WO 2019068681 A1 4/2019
WO 2019170286 A1 9/2019
(Continued)

OTHER PUBLICATIONS

Heralic A et al., "Height control of laser metal-wire deposition based on iterative learning control and 3D scanning", Optics and Lasers in Engineering 50 (2012) 1230-1241. (Year: 2012).*
(Continued)

*Primary Examiner* — Thomas C Lee
*Assistant Examiner* — Michael Tang

(57) ABSTRACT

In the context of additively manufacturing a solid object using extrusion deposition, closed-loop control of flow rate is achieved using a distance measuring tool to scan a surface of a layer that has been deposited using a first flow rate, comparing data from the scan to a desired target value and using a control algorithm to calculate a corrected second flow rate to be applied when depositing a subsequent layer. In some embodiments, the control algorithm is a proportional-integral control algorithm. In some embodiments, a solid object shape may result in some layers having multiple isolated regions and separate closed-loop control instances may be applied to the separate regions.

12 Claims, 18 Drawing Sheets

(51) Int. Cl.
*B33Y 10/00* (2015.01)
*B33Y 40/00* (2020.01)
*B33Y 50/02* (2015.01)

(58) Field of Classification Search
USPC .......................................................... 700/98
See application file for complete search history.

(56) References Cited

U.S. PATENT DOCUMENTS

| | | |
|---|---|---|
| 9,327,537 B2 | 5/2016 | Conrow et al. |
| 9,738,032 B2 | 8/2017 | Folkins et al. |
| 10,207,363 B2 | 2/2019 | Craig et al. |
| 10,265,911 B1 | 4/2019 | Capri et al. |
| 10,421,267 B2 | 9/2019 | Reese et al. |
| 10,639,721 B2 | 5/2020 | Das et al. |
| 10,719,929 B2 | 7/2020 | Craeghs et al. |
| 10,898,969 B2 | 1/2021 | Kanko et al. |
| 10,953,609 B1 | 3/2021 | Mark |
| 10,974,456 B2 | 4/2021 | Khairallah et al. |
| 11,014,163 B2 | 5/2021 | Preston et al. |
| 11,014,305 B2 | 5/2021 | Mark |
| 11,084,225 B2 | 8/2021 | Pinskiy et al. |
| 11,084,276 B2 | 8/2021 | Reese et al. |
| 11,097,490 B2 | 8/2021 | Putman et al. |
| 11,112,771 B2 | 9/2021 | Guerrier et al. |
| 11,141,921 B2 | 10/2021 | Ramos et al. |
| 11,155,040 B2 | 10/2021 | Matusik et al. |
| 11,198,284 B2 | 12/2021 | Gibson et al. |
| 11,225,018 B2 | 1/2022 | Wu et al. |
| 2015/0039150 A1 | 2/2015 | Lin |
| 2015/0045928 A1 | 2/2015 | Perez et al. |
| 2015/0174828 A1 | 6/2015 | Creuzer et al. |
| 2015/0273583 A1 | 10/2015 | Bumgardner |
| 2015/0328839 A1 | 11/2015 | Willis et al. |
| 2015/0331402 A1 | 11/2015 | Lin et al. |
| 2017/0050382 A1 | 2/2017 | Minardi et al. |
| 2021/0387416 A1 | 12/2021 | Thomas |
| 2022/0063184 A1* | 3/2022 | Hikmet ................ B29C 64/209 |
| 2022/0168962 A1* | 6/2022 | Avdeev ................ B29C 64/245 |
| 2023/0271386 A1* | 8/2023 | Zhu ....................... B29C 64/209 |
| | | 264/40.1 |
| 2024/0272612 A1* | 8/2024 | Schweid ................ B22F 10/22 |
| 2025/0050447 A1* | 2/2025 | Buller ..................... B22F 12/45 |

FOREIGN PATENT DOCUMENTS

| | | |
|---|---|---|
| WO | 2019191683 A1 | 10/2019 |
| WO | 2020068399 A1 | 4/2020 |
| WO | 2021242354 A1 | 12/2021 |

OTHER PUBLICATIONS

PCT International Search Report and Written Opinion for International Search Authority for PCT/US2025/011538, mailed Jun. 23, 2025 (16 pages).

* cited by examiner

FLOW RATE CONTROL IN EXTRUSION DEPOSITION PROCESS

CROSS-REFERENCE TO RELATED APPLICATIONS

This non-provisional patent application claims priority to U.S. Provisional Application Ser. No. 63/622,800, Entitled "Flow Rate Control in Extrusion Deposition Process" by Andrew John Stewart Edwards, et al., filed on Jan. 19, 2024, incorporated herein by reference under the benefit of U.S.C. 119(e).

TECHNICAL FIELD

The present disclosure relates to the field of additive manufacturing by extrusion deposition and, more particularly, to control of flow rate at which a material is discharged from an extrusion nozzle.

BACKGROUND

Extrusion deposition modeling (EDM) is an additive process for building solid objects that involves melting a solid material, such as a thermoplastic, forcing the melt through a nozzle and depositing the molten material along a particular path onto the surface of a gradually enlarging workpiece formed from previous melt deposition which has already cooled and re-solidified. As material flows out of the nozzle, the motion of the nozzle relative to a substrate or so-called 'build plate' is mechanically implemented using a motion control system comprising computer-controlled motors. By depositing extruded material, initially to a bare surface of the build plate and then to a workpiece that is progressively formed thereon, a finished object having specific dimensions and contours may be formed. Common materials used for EDM include ABS (acrylonitrile-butadiene-styrene), PLA (polylactic acid), terephthalate esters and nylon (polyamide), although an increasingly wide array of plastics and other materials are being successfully 'printed' as the technology matures.

In contrast to traditional means, such as casting, molding or machining from a solid block, additive manufacturing allows for forming an arbitrary object shape without shape-specific tooling and without generating significant scrap material. However, to rival the mechanical strength and integrity of solid objects that have been formed by these other techniques, extruded materials often need to be deposited in a fully dense arrangement without voids. Voids among material deposits may structurally weaken the object, reduce dielectric strength, cause cosmetic defects and form passages that undermine containment of gases and liquids. To reliably achieve this 100% fill density, the flow rate, meaning the volume of material discharged from a nozzle in proportion to its lateral travel, must be precisely controlled. Even a slight deviation from the optimum eventually creates either a cumulative excess or a cumulative shortfall in volume of material deposited, which noticeably undermines part quality. It has been common practice for an operator to manually monitor and adjust flow rate. While this may suffice when a part is built on a small scale or when sparse interior fill is employed, this approach is inherently imprecise, reactive in nature and prone to overcorrection, making it wholly inadequate for precise control to achieve, for example, 100% fill density. Thus, improved methods are needed for precisely controlling flow rate even when there are perturbing factors that necessitate fine adjustments in flow rate during a build process.

SUMMARY

The present disclosure provides for precise control of flow rate in an extrusion deposition modeling system, which may be a form of robotic system for forming a solid object by depositing layers of an extruded material in a controlled pattern according to a digital model of the object. In this context, the present disclosure describes a method, in accordance with at least one aspect of the present teachings, for controlling a fill proportion (or 'fill density') of the deposited layers that involves depositing a first layer of material using a first flow rate value, optically scanning the deposited first layer to obtain profile data of the first layer and calculating a difference between the scanned profile data and an expected value for the profile data. The method further involves using the calculated difference in a control algorithm that calculates a corrected second flow rate value using the difference value and a cumulative value of differences from scanning a plurality of previously deposited layers. A second layer is deposited using the corrected second flow rate value and the print-and-scan process may be repeated in subsequent layers. The expected value for the first layer profile data may be selected to assure a consistent 100% fill density. In accordance with some further aspects of the present teachings, the method may include detecting that a layer formed by slicing the digital model comprises a plurality of non-overlapping polygons and applying separate a flow rate and set of scanning instruction for separate polygons within a layer.

BRIEF DESCRIPTION OF THE DRAWINGS

Various exemplary embodiments are illustrated by way of example, and not by way of limitation, in the following detailed description, claims and accompanying drawings, in which like reference numerals refer to similar elements and in which:

DETAILED DESCRIPTION

In the following description, for the purposes of explanation, numerous specific details are set forth to provide a thorough understanding of illustrative and preferred embodiments of the invention. It is apparent, however, that some embodiments may be practiced without all of the specific details mentioned or with alternative, equivalent arrangements. In some instances, more common structures and devices are excluded from view or shown in block diagram form to avoid unnecessarily obscuring components that are more essential for illustrating embodiments of the invention and its operating principles.

As used herein, the word 'comprising' shall mean 'including at least' and is not to be interpreted as 'including only' or precluding additional elements.

Generally applied, the phrase 'closed-loop control' or 'feedback control' refers to a process of applying a stimulus to a system, gaging the response of the system relative to an intended response and adjusting some aspect of a subsequent stimulus to maintain the system response as close to the intended response as possible. In the context of the present disclosure, the phrase 'closed-loop control' will apply to using a given flow rate for depositing a material from an extruder, measuring a profile of the material that has been deposited using the flow rate, comparing the measured profile to an target profile, calculating a corrected flow rate based on a difference between the measured and target profiles and subsequently depositing material using the corrected flow rate.

Closed-loop control contrasts with using a so-called 'open-loop' system wherein a stimulus is applied without monitoring the resulting effect on system state. An example of an open-loop system is the application of movement signals to a stepping motor. Unlike a servo motor, a stepping motor is generally used without a positional encoder for confirmational feedback and the signals sent to the motor are assumed to have successfully rotated the shaft to a given position.

Because both filament-fed and pellet-fed extrusion deposition systems may benefit from the present teachings, and because some systems may use a combination of these approaches in a way that further motivates implementing these teachings, brief descriptions of both types of systems are presented next. To be clear, however, these two example contexts should not be construed as limiting possible embodiments to only these contexts and that other systems may be suitable for applying the principles set forth herein.

Figure 1:
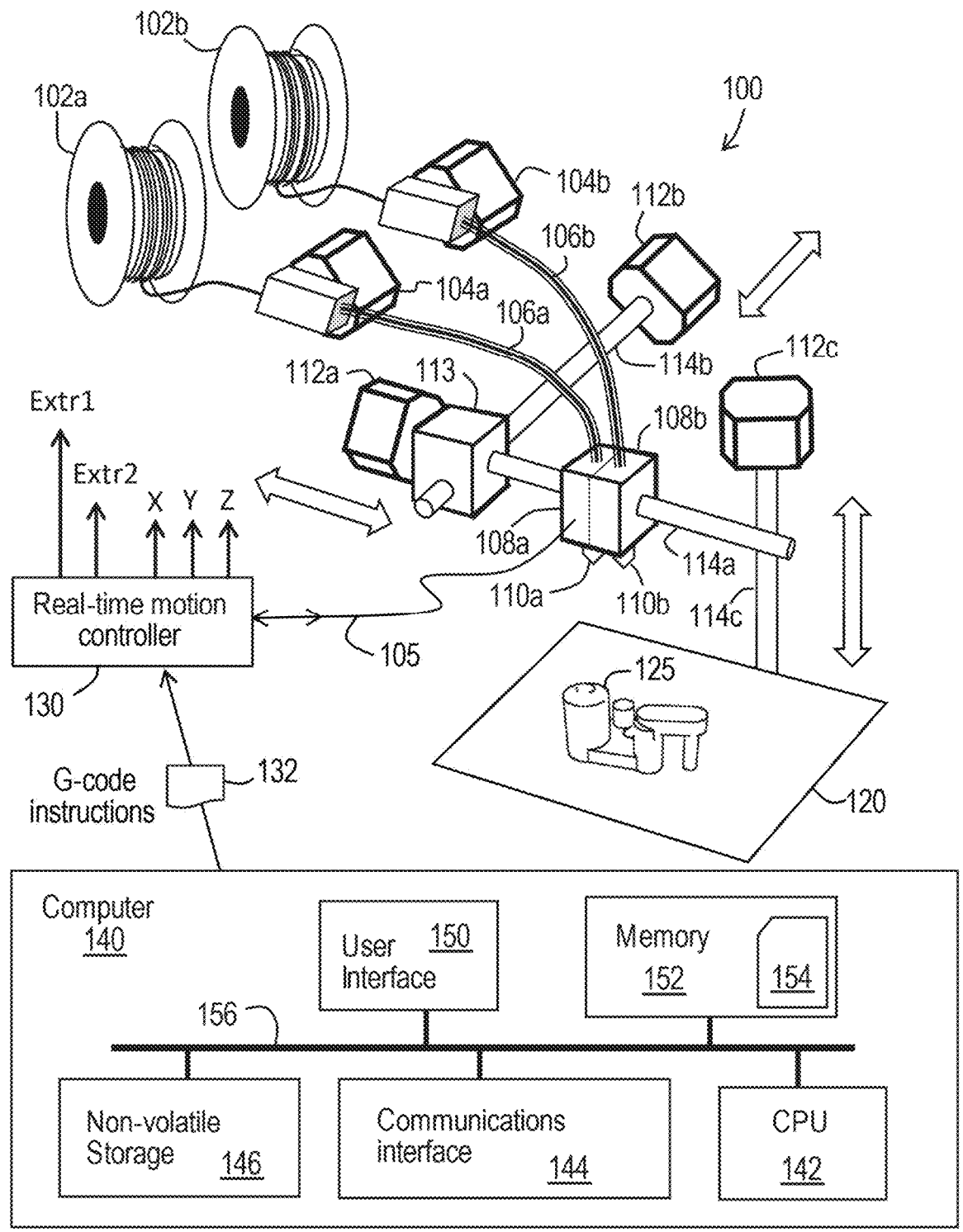
FIG. 1 is a pictorial depiction of a first typical extrusion deposition system, configured to use a filamentous feedstock material, as a first example context wherein the present teachings may be applied.

FIG. 1 depicts an arrangement of components for a 3D printing system 100 typical of a commonly available desktop-size 3D printer. System 100 is a filament-supplied extrusion deposition system as one example context within which the present teachings may be applied. Material for making items is provided in the form of a filament wound on spools 102a and 102b. Filament from spool 102a is fed into a first motor-driven extruder 104a. Likewise, in a dual extruder system as shown, filament from spool 102b is fed into a second motor-driven extruder 104b. Under control of a motion control computer, such as controller 130, extruders 104a and 104b push the filaments through flexible tubes 106a and 106b, respectively. Each filament, driven from some distance away, is forcefully fed into its respective heater block 108a and 108b.

The output of heater block 108a is at the tip of nozzle 110a. Heater block 108b ejects extrudate from the tip of nozzle 110b. In the configuration shown, both nozzles 110a and 110b move horizontally in tandem as driven by X-axis motor 112a and Y-axis motor 112b acting upon respective lead screws 114a and 114b. (For simplicity, the lead screw threads are not explicitly drawn.) In the arrangement shown in FIG. 1, Y-axis motor 112b turns lead screw 114b to cause a block 113 to move further or closer to the Y-axis motor. X-axis motor 112a and its corresponding lead screw 114a move along with block 113. X-axis motor 112a may also independently turn lead screw 114a to cause the heater blocks 108a and 108b to move in a direction orthogonal to the direction of motion created by X-axis motor 112b. By this arrangement, nozzles 110a and 110b can be moved around in a horizontal plane along two separate axes, essentially covering an entire planar surface.

Z-axis motor 112c may be controlled to turn lead screw 114c so that it can, in turn, control the elevation of a work surface or "build plate" 120 relative to the nozzles 110a, 110b. Shown atop build plate 120 is an example workpiece 125 representing an object being constructed progressively by addition of materials from either or both of spools 102a, 102b. It should be understood, however, that just before a construction process begins, the build plate will generally be blank until the extruders start depositing material to form a first layer of traces. In the arrangement shown in FIG. 1, a build will be initiated by driving Z-axis motor 112c such that build plate 120 is elevated to a point that nearly brings it in contact with nozzles 110*a* and 110*b*. To form the first layer of a workpiece, X-axis motor 112*a* and Y-axis motor 112*b* will be controlled to move around just above the build plate while either or both of extruder drives 104*a*, 104*b* force molten filament to be extruded from the nozzles 110*a* and 110*b*. Once an initial layer of material has been deposited in this fashion, then Z-axis motor 112*c* will generally be directed to turn lead screw 114*c* slightly so that build plate 120 moves downward and further away from the plane in which nozzles 110*a*, 110*b* are moving. At this point, the apparatus is prepared to lay down a second layer of material upon the initial layer that is contacting build plate 120. The remainder of the workpiece is constructed by iteratively lowering the build plate (effectively raising the nozzles relative to the build plate) using Z-axis motor 112*c* and then coordinating the motion of nozzles 110*a*, 110*b* to deposit extruded filament under the control of X-axis motor 112*a*, Y-axis motor 112*b*, and either or both of extruder drives 104*a* and 104*b*. This process is repeated until all layers have been deposited and the workpiece is completely formed.

For clarity and simplicity, FIG. 1 shows principal components and excludes many gantries, support structures or framework and other details such as pulleys, belts, wires, linear and rotary bearings, thrust bearings, etc. It should be understood that, while FIG. 1 depicts one possible arrangement for control motors to move nozzles about in a controlled fashion with respect to build plate 120, a wide variety of possible designs are possible and commonly implemented. Other configurations are known where nozzles move in X, Y and Z axes over a stationary build plate. Some devices use three separate arms that may each vary in length to effectively triangulate a position for a nozzle at any given moment. All of these techniques are well-known and equivalent for the purposes of the current teachings. The current teachings would be equally applicable to, and achievable by, all of these variations. The motors can be stepping motors, DC servos, linear actuators or be of any other form to drive the required motions.

In FIG. 1, a real-time motion controller 130 is provided mainly for exercising synchronized control over all of the aforementioned mechanisms, including extruder motors, and the motors that control the relative positioning of nozzles 110*a*, 110*b* and build plate 120. In most systems, controller 130 also controls electrical supply to heater blocks 108*a* and 108*b* and may also receive input from a thermocouple or thermistor for each one of the heater blocks, so controller 130 can be involved in establishing a fixed temperature for each heater block. Integrating temperature control functions into controller 130 makes it possible for the heater block temperatures to be programmatically controlled within the same software or script that controls the extruder and nozzle motion motors. During preparation of machine instructions, control of heater block temperatures is thus made available to the designer of a workpiece being constructed via G-code instructions, more specifically 'M' prefixed command codes, which are described below. Nozzle temperature settings may be optimized for different materials, flow rates and desired physical characteristics of the finished object. Connection 105 refers to both the passage of electrical current to one or more resistive heating elements from controller 130 as well as temperature sensing thermocouple or thermistor signals from heater blocks to controller 130.

In some implementations, the build plate 120 is also heated by resistive heating elements supplied by electrical current from controller 130. In systems that implement this feature, controller 130 receives temperature readings from a thermocouple or thermistor coupled to build plate 120 and maintains the build plate temperature as specified in 'M' prefixed command codes.

In some systems, additional peripheral devices may be controlled by the controller. For example, it is common for a cooling fan to be attached somewhere in the vicinity of heating blocks 108*a*, 108*b*. The optional cooling fan moves in conjunction with the nozzles and hastens the cooling of the newly deposited extruded filament, as is desirable for some builds. These may be also controlled by certain 'M' prefixed commands.

Controller 130 generally implements 'real-time' control over the motors and other components, meaning that where specific timings and speeds are called for to deposit extrudate in a desired pattern, the firmware in the controller is dedicated to adhering to the specific timings to achieve consistent results. This is very important given the speed with which the nozzles must move for some projects and the fact that the extruded filament is emitted from the nozzles more or less continuously. It is important that the controller 130 not hesitate at inopportune times which could cause extruded material to build up in some places in an undesirable fashion or cause other anomalies or interruptions that would be apparent in the finished object being built.

Accordingly, controller 130 generally does not make calculations as to how to build a certain object but instead accepts fairly simple, sequential instructions in the form of so-called "G-code" instructions. (G-code programming is best known in the context of automated or so-called CNC (Computer Numerical Control) machining and is described in EIA Standard RS-274.) The detailed instructions of how the motors and extruder drives must be coordinated to build a given object are calculated by a separate computer before the time that the object is actually built on build plate 120. These calculations are reduced to discrete commands of positions and speeds for operating the various motors. To ensure timely control of the various moving parts, real-time controller 130 acts as a 'slave' processor that simply reads and acts upon the sequence of relatively simple motor control instructions that have been prepared beforehand by a separate 'master' processor.

A master processor may determine, for example, that part of an object build requires a circular arc to be printed and may apply trigonometric functions to calculate a series of short segments to form the arc. As each segment involves moving the nozzles in a straight line from a first X-Y position to a second X-Y position, these beginning and ending coordinates are each listed as a single line of G-code instruction along with the rate at which the movement is to occur. The same G-code instruction may also instruct that, during the movement, an extruder motor is to drive a filament forward by a given amount.

The desired motion is called for by the instructions regardless of whether the actual motors of the 3D print mechanism are stepper motors or DC servos and regardless of how many turns of a shaft, pulley or lead screw are needed to accomplish the displacements specified in the G-code instruction. It is the job of the real-time controller 130 to determine, for example in the case of stepping motors, the quantity and timing of current pulses that must be applied to one or more motor windings to accomplish the motion called for in the G-code instructions. It may be said that the G-code instructions are largely independent of the specific 3D print mechanism being used and that the G-code instructions are therefore fairly portable to any printer (subject to maximum print size, of course.) The real-time controller associated with a given 3D printer mechanism interprets the G-code commands and determines how to accomplish the specified motions in the context of that particular mechanism.

One commercially available 3D printer that operates in roughly the manner just described is the 'UltiMaker S3' manufactured by Ultimaker BV headquartered in Utrecht, Netherlands. (The X-Y motion on this model is accomplished using belts and pulleys rather than lead screws, but the relevant operating principles remain the same.) This model of 3D printer is one suitable platform for implementing the techniques described elsewhere herein.

In FIG. 1, a separate computer 140 is shown as an example of a master processor for producing G-code instructions and may be fulfilled, for example, by any variety of personal computer. Computer 140 is shown to comprise a central processing unit or CPU 142, a communications interface 144, a non-volatile storage 146 and a user interface 150. Computer 140 is also shown to comprise memory 152 which is shown to contain, among other things, STL model file 154 or other data representing the shape of an object to be constructed. The various elements shown inside computer 140 communicate over a data bus 156. User interface 150 may comprise an end-user display, such as an LCD or LED flat-panel display and one or more user input devices such as keyboards, pointing devices, etc. Communications interface 144 may allow data communications with other processors and may be implemented in the form of an Ethernet connection, a wireless LAN connection, a USB interface, an RS-232 interface, or any of a number of other possible communications ports and protocols. In particular, communications interface 144 may be the means by which computer 140 communicates G-code instructions 132 to real-time motion controller 130. A user may connect computer 140 to real-time motion controller 130 through a USB cable or so-called "FireWire" connection. Alternatively, a user may insert a portable data storage device into a USB port of computer 140 and transfer files including G-code instructions 132 onto the portable storage device (or so-called 'thumb drive' or 'jump drive'). The user may then withdraw the drive from computer 140 and plug it into a similar USB interface (not shown) supported by controller 130. When a build is commenced, controller 130 may read the G-code instructions directly from the portable data storage device and responsively cause the heaters, extruder drives and X-Y-Z drive motors to actuate.

Non-volatile storage 146 corresponds to the typical so-called 'hard drive' commonly found in personal computers. Non-volatile storage 146 typically contains boot information, operating system executables, and applications that the computer can load into memory 152 and execute. Non-volatile storage 146 also provides a persistent store for one or more user data files, such as STL files (which describe 3D surfaces) and G-code files. Memory 152 serves to temporarily store instructions for CPU 142, as well as data including operating system components, applications, and data used by applications. Software logic processes described elsewhere herein may be allocated one or more memory spaces 154, such as blocks or ranges of memory locations, for storing and efficiently manipulating data sets, such as vertices in a 3D model and lists of toolpath vertices or G-code instructions.

Figure 2:
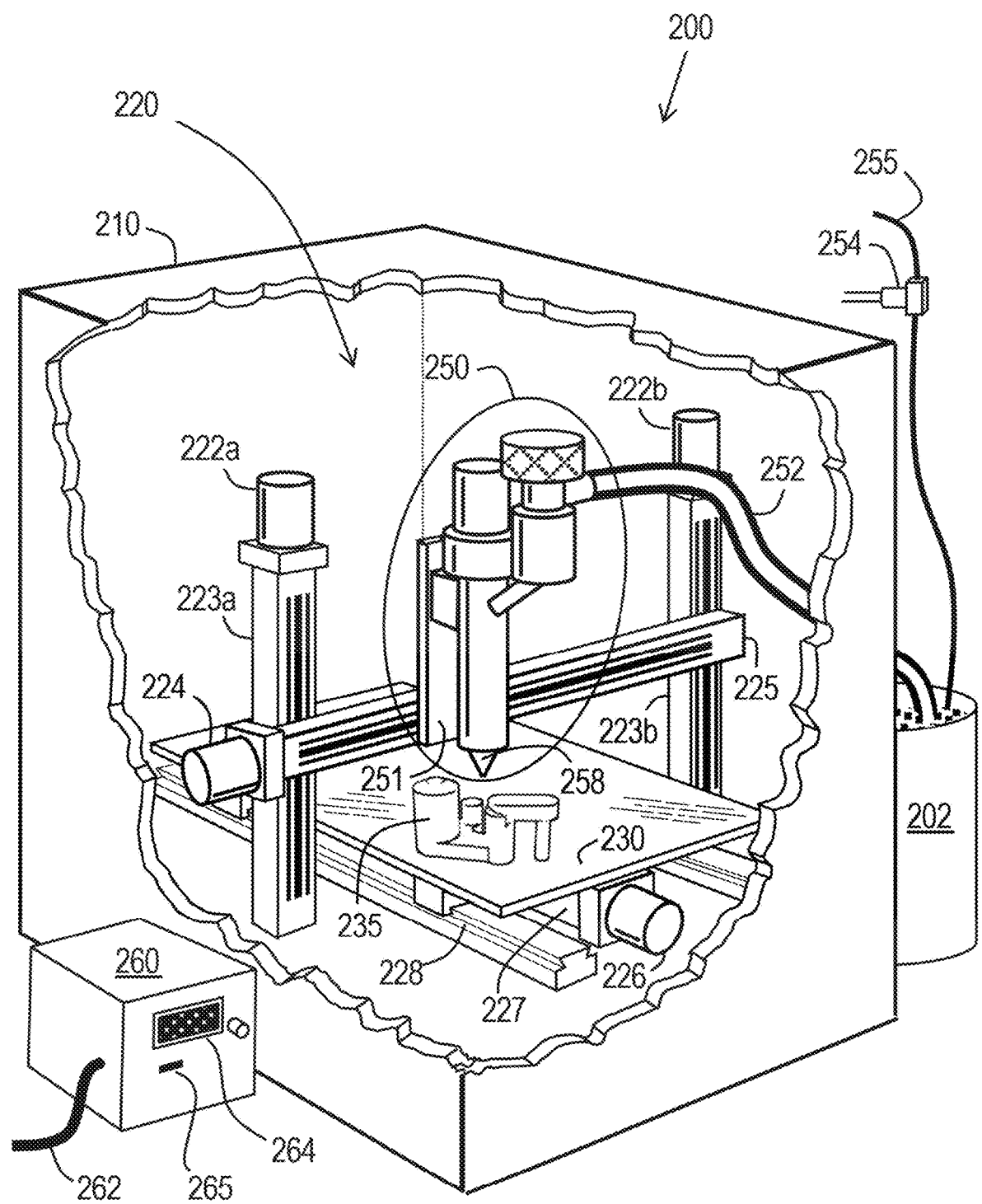
FIG. 2 is a pictorial depiction of a second typical extrusion deposition system, configured to use a pelletized feedstock material, as a second example context wherein the present teachings may be applied.

As an alternative to a filament-supplied extrusion deposition system 100, FIG. 2 illustrates a pellet-fed extrusion deposition system 200. Pellet extruders offer certain advantages in industrial settings, particularly for cost-effective, large-format printing. Performing EDM using common materials such as ABS also benefits greatly by operating within a heated enclosure.

Recently applied to serve as moving 3D printing heads, direct pellet extruders offer many advantages over the types of extruders that accept fixed-diameter solid filament from a spool. As a principal advantage in industrial printing, a pellet extruder can handle long, uninterrupted builds that would otherwise consume multiple conventional-size spools when using a filament extruder. For example, using a pellet extruder, a large 3D printed object with a mass of 100 Kg can be formed over a period of hours or days of continuous printing. In contrast, a filament-type extruder building the same object would require numerous interruptions for changing spools, which are commonly supplied in 1 Kg, 10 Kg or 25 Kg sizes. At each point during the build when an empty spool of material must be replaced, there is a risk of affecting the quality of the object and, in some cases, the interruption may even jeopardize an entire print process in which hours of print time and considerable expense have already been invested.

Another factor in favor of extruding directly from pellets is reduced cost. Plastics in pelletized form are considerably less costly than plastics that have already been formed into precise-diameter filament. Furthermore, because of the direct conversion from bulk pellets to molten form, a pellet extruder can print materials that are not amenable to being intermediately formed, stored and manipulated as solid filament, such as polypropylene, glass-filled polycarbonate, polyethylene and PVC. A direct pellet extruder can also support high throughput and large diameter discharge, such as through a 6 mm nozzle. This is considerably larger than the largest practical filament sizes of around 3 mm which often discharge through a nozzle opening of 1 mm or less. Thus, a direct pellet extruder can print large objects hundreds of times faster than a practical filament-supplied print head.

Some extrusion deposition systems may simultaneously employ both one or more filament-fed extruders and one or more pellet-fed extruders. Due at least to differing responses in melt passage shape, pressures, temperatures and responsiveness to extruder motor movement, these extrusion mechanisms may behave differently as one applies precise flow rate control as set forth in the present disclosure. Therefore, it is important to briefly describe a pellet-fed system as an alternative context within which the present teachings may be applied.

FIG. 2 depicts an enclosed extrusion deposition modeling (EDM) system 200. System 200 is shown to comprise a motor driven multi-axis motion control system 220 which controllably moves extruder head 250 relative to build plate 230. The motion control componentry combined with extruder head 250 constitute an extrusion deposition modeling system, that is, a form of 3D printer. Multi-axis motion control system 220 as shown creates movement along three orthogonal axes in an arrangement known as a Cartesian coordinate system wherein any point within the build space is referenced by a unique triplet of scalar values corresponding to displacement along three mutually orthogonal axes. An example object 235 is shown to have been formed on build plate 230.

Extruder head 250 is shown to be attached to carriage 251 that is controllably moved along the long axis of transverse beam 225 by the rotation of the shaft of an X-axis motor 224. Typically, beam 225 will comprise one or more linear bearings facilitating the smooth movement of carriage 251 parallel to the long axis of beam 225. Furthermore, beam 225 may house a lead screw (not distinctly visible in the diagram) which is coupled to carriage 251 by a precision nut, fixed within the beam 225 by rotary and thrust bearings and coupled to the shaft of X-axis motor 224. The rotation of the shaft of X-axis motor 224 may rotate the lead screw which, in turn, will cause carriage 251 to move closer to or further away from motor 224 in a controlled manner. X-axis motor 224 is often a stepping motor but may also be an AC or DC servo motor with a shaft position encoder and/or tachometer operating in a closed-loop control mode to facilitate moving to very precise positions. Many such arrangements of motors, lead screws, bearings and associated components are possible.

Whereas the arrangement of motor 224 and beam 225 accomplish controlled movement of the extruder head 250 in what may be termed the horizontal X-axis in the print-space coordinate system, motors 222A, 222B and their respective columns 223B, 223A may use a similar arrangement of linear guides, bearings and lead screws such that Z-axis motors 222A, 222B controllably move extruder head 250 in a vertical direction, that is, closer to or further away from build plate 230. More specifically, beam 225 may be attached to carriages (hidden) that couple to lead screws within columns 223A and 223B. As Z-axis motors 222A and 222B rotate their respective lead screws in synchrony, the entirety of beam 225, X-axis motor 224 and extruder head 250 are caused to move upward or downward.

To accomplish yet another motion of build plate 230 relative to extrusion head 250, a third motor, which may be referred to as Y-axis motor 226 may act upon a lead screw 227 to which the build plate 230 is coupled. The rotation of the shaft of motor 226 controls the position of build plate 230. Build plate 230 may be supported by, and may slide or roll along, linear bearing rails such as rail 228.

It should be understood that the arrangement of motors, bearings and such depicted in FIG. 2 is merely one example of achieving controlled relative motion between extruder head 250 and build plate 230 such that an object is formed by the extrusion of materials through nozzle 258. Various other arrangements are common and equally suitable as an embodiment in which the present invention may be applied. For example, in some arrangements, the build plate may move in two horizontal axes while the extruder head may move only vertically. Alternatively, the build plate may only move vertically while an extruder head moves in two horizontal axes. In yet other arrangements, an extruder head may be coupled to a motor driven gantry that accomplishes motion in all three axes while the build plate remain stationary. The present invention is equally applicable to a wide variety of arrangements motion control arrangements independently including those just mentioned, as well as so-called 'Core XY', 'H-bot' and 'delta' arrangements.

In addition, it should be understood that, for simplicity, FIG. 2 excludes many fasteners, brackets, cables, cable guides, sensors and myriad other components that may be employed in the manufacture of such systems but which are not essential for explaining the principles of the present invention nor for describing the best mode thereof. Where linear guides and lead screws have been described, it should be understood that the present invention is not limited to being applied to machines that use such mechanisms and that, for example, belt driven systems and gear driven systems are equally suitable for use and susceptible to the challenges that the present invention addresses.

Extrusion head 250 is described in further detail below. In summary, the role of extrusion head 250 is to receive plastic in pellet form driven by bursts of air through a feed tube 252 and to melt the plastic and drive it out of the end of nozzle 258 in a continuous stream. Typically, plastic pellets are stored in a large external pellet reservoir 202 and provided to the extruder head 250 in small increments as needed. A detector (to be shown and described below) included with the extruder head 250 determines when additional pellets are needed and electrically controls the actuation of an air valve 254 which switches on a momentary burst of compressed air as provided by compressed air inlet 255.

To accomplish the formation of a solid object in three dimensions upon the build plate 230 from extruded materials emanating from the tip of nozzle 258, a control box 260 is provided with electronics, such as a microprocessor and motor drive circuitry, which is coupled to the X, Y and Z motors as has been described above, as well as to numerous sensors and heating elements, in the system 220, some of which will be described further below in connection with FIG. 2. Electronics within control box 260 also control an extruder motor, to be described below. Some examples of suitable control electronics which may operate within control box 260 are the RAMBo™ control board manufactured by UltiMachine running Marlin firmware or the like.

A wide variety of 3D printer control boards may be used. The primary role of such controller boards is to interpret sequential lists of positional commands, such as so-called G-code files and to output signals that drive the motors to implement the commanded movements. A G-code file, or the like, describing the coordinate movements necessary to form a particular object may be supplied to the controller through connection of the controller to a wired data communications network via, for example, TCP/IP communications through an Ethernet connection or via a wireless network connection, such as 'WiFi' or IEEE 802.11 connection. A G-code file (or a data file, such as a file in STL format from which a G-code file may be prepared) may also be supplied on a removable flash memory card, such as an SD card, which may be inserted at SD card slot 265 on control box 260. The electrical power to drive the control box 260 and the motors, sensors and heating elements of system 220 comes from a connection to electrical power lines 262.

For providing a human-accessible control interface, essentially all of the commercially available control boards support an LCD display and user interface 264, as is shown to be a part of control box 260 in FIG. 2. Control box 260 may contain similar computing components and perform any or all the same complement of functions as described earlier for real-time motion controller 130 in FIG. 1. For either of controller 130 or control box 260, a user interface typically allows for a system operator to adjust, even as the build process continues, feed rate, flow rate and various temperatures, even though these may already be specified in the G-code instructions. The operator's interface for feed rate and flow rate is usually presented as a percentage scaling factor such that all programmed feed rates and flow rates are scaled by the operator's adjustment. If an operator leaves the controls at 100%, then the system adheres to the feed rate (in mm/min) and flow rate (in cubic mm discharge per mm) values expressed in G-code parameters. However, if an operator sets a feed rate scaling factor of 80%, then all programmed feed rates will be multiplied by a factor of 0.80 and the build process will proceed more slowly. If an operator adjusts the relative flow rate to 110%, then the extruder will discharge 10% more material per unit of lateral travel than each G-code instruction's extrusion parameter specifies. This implies that a real-time motion controller must multiply or scale programmed values 'on the fly' during a build.

Build plate 230 is preferably heated to a controlled temperature, most commonly using electrical resistance heating elements (not visible in the diagram) which may be mounted under the bed and thermally coupled thereto. For this purpose, it is common to use a heating mat made of high-temperature-rated silicone rubber that has electrically conductive paths embedded within and is adhered to the bottom of the build plate. A temperature sensor, such as a thermistor is typically included to provide feedback to a temperature controller which maintains a set build plate temperature by controlling the application of heating current to the heating mat. Such elements for heating the build plate are commonplace and need not be further described here.

The temperature within enclosure 210 may be elevated over typical room ambient temperature by the addition of yet other heating elements (not shown) and, to some extent, by the heat incidentally dissipated from build plate 230. While a heated enclosure that is controlled to stay at an elevated temperature is often useful, fluctuations in temperature may be caused by convective currents, forced air cooling directed at a printed part or momentary opening of an enclosure door by an operator of the system to observe or adjust some aspect of the system. While such disturbances have previously been considered mild or negligible in effect, empirical observations using an apparatus to be described in FIG. 5 have revealed that such temperature variations can noticeably shift flow rate requirements, especially when aiming for 100% fill density.

Both of the extrusion deposition systems 100 and 200 described above are capable of discharging and depositing thermoplastic material in a controlled manner as directed by G-code instructions or the like. In some applications, a designer may desire to achieve a 100% fill density within a part being formed by the system, which generally entails G-code instructions that cause traces of material to be deposited alongside one another so they contact each other and precisely occupy a sufficient volume to leave no room for voids therebetween. In practice, controlling extrusion flow rate over many traces per layer and over many build layers to arrive at an exact 100% fill density, without cumulative over- or under-filling, requires exceptionally precise control that has been heretofore difficult to achieve.

To illustrate effects of various degrees of extrusion filling, FIGS. 3A-3D are pictures of the gross appearance of a block of material that has been formed by extruding beads of material in layers, in this case with all beads being laid in parallel. (Infill traces that alternate in direction layer-by-layer suffer from the same flow control challenges but are less suitable to illustrate the point using cross sectional views.) Each of FIGS. 3A-3D depicts a different flow condition and is sectioned, as if sawn open, to reveal internal bead profiles.

Figure 3A:
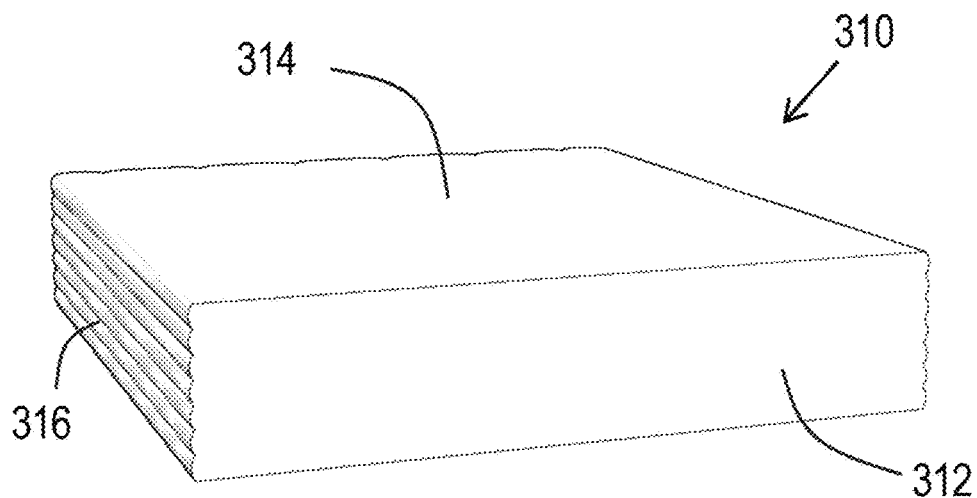
FIGS. 3A-3D are sketches of block shapes formed by extrusion deposition and under varying flow rate conditions.

FIG. 3A shows a first solid block 310 that represents an ideal, solidly filled condition that is neither under-extruded nor over-extruded. Note that, using conventional approaches, this condition is exceedingly difficult to achieve, especially over large parts with varying geometries. As evidence of perfectly solid filling, no voids are observed on the cross-section surface 312 and, along top surface 314, mild grooves that would parallel the extruded traces may be barely visible or non-existent. Ideally, the mechanical properties of a solid shape formed in this fashion should be comparable to a solid billet or shape formed by other means, such as by injection molding. This condition of being solidly filled while also conforming to a designed outer contour is not only useful for creating finished parts but also supports reflow techniques wherein a part initially formed by layered deposits is then encapsulated in a loose powder, such as a fine inorganic salt, and subjected to melting temperatures to achieve more isotropic properties. The latter technique requires eliminating any internal voids from the initially formed part. A side surface 316 exhibits the usual ridges or 'corduroy effect' formed by the side edges of outer beads stacked in successive layers, but these ridges are ideally very straight and consistent and are oftentimes aesthetically desirable or acceptable.

Figure 3B:
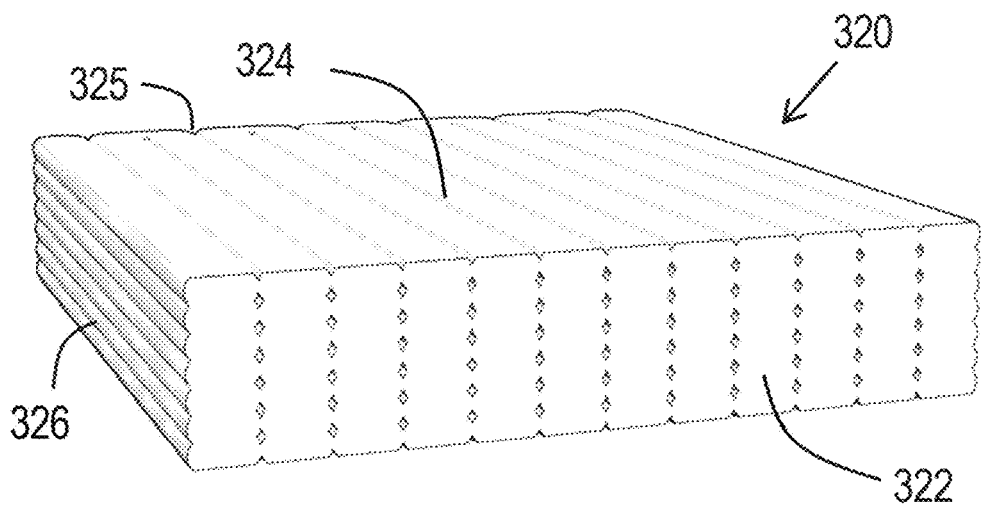

FIG. 3B shows a second, densely filled block 320 that is more easily and typically attained in an additive extrusion process by operating with a flow rate that is slightly less than that shown in FIG. 3A and slightly less than the volume-per-unit-travel that would fully account for the space passing under the nozzle. Due to the regular alignment of traces side-to-side and from layer-to-layer, this condition is susceptible to leaving regularly spaced elongated voids, evident along sectioned surface 322, though some variability may close off some of these passages in random places. Discharge temperature and other factors may affect the size and appearance of these internal voids. The top of block 324 shows a mild groove 325 formed between adjacent traces in this slightly underfilled situation. The side surface 326 of block 320 appears essentially the same as side surface 316.

Figure 3C:
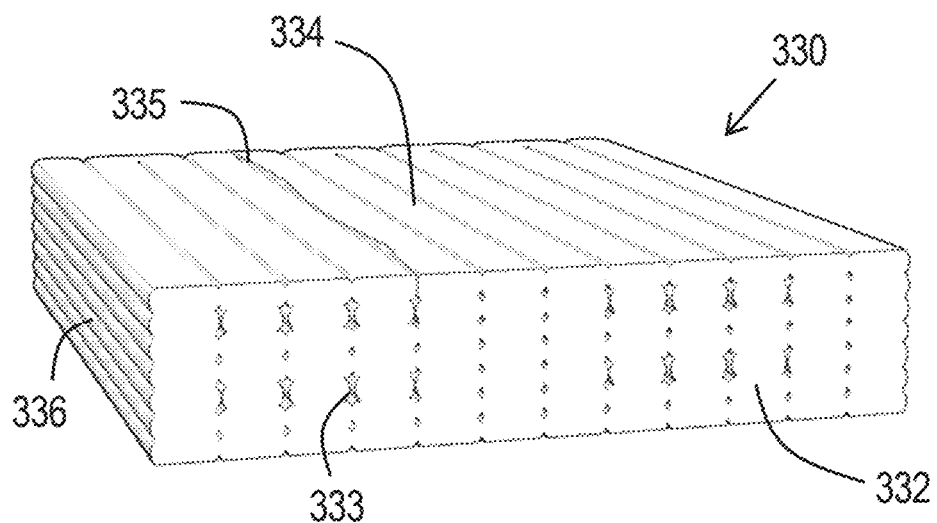

To show a more problematic condition, FIG. 3C shows block 330 having been formed with under-extrusion to the point that significant voids 333 occur between some adjacently laid traces as revealed upon sectioned surface 332. In general, traces that are deposited side-by-side one bead width apart are intended to make contact and to fuse together to form a cohesive layer. However, some voids may propagate over several layers or extend to a part top surface 334 resulting in a crevice 335. A part formed under the conditions shown in FIG. 3C may be mechanically weaker and more permeable to fluids. Side surface 336 may or may not exhibit noticeable effects caused by under-extrusion, meaning that an internal under-extruded condition might be concealed unless a print is monitored during the build.

Figure 3D:
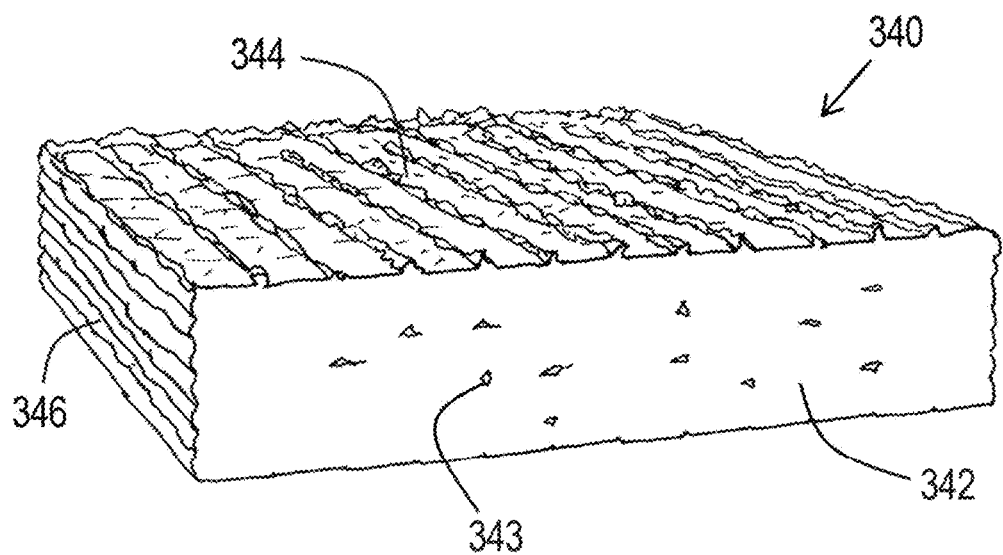

Erring in the other direction, FIG. 3D shows a block 340 formed under an over-extruded condition, meaning that a greater volume of build material is discharged than needed to fill the space between the nozzle and the part. The top of block 344 shows severe 'churning' as the excess accumulated build material climbs past the current height of the nozzle and the heated nozzle both plows through the previously deposited material and continues to discharge more material that has no place to go. It is this visually evident effect that many printer operators rely upon to signal over-extrusion and they respond by reducing the flow rate in a coarse fashion.

Note also that the outer trace forming the side surface 346 of block 340 are considerably distorted and that the sectioned surface 342 shows occasional irregular voids 343. Ironically, the voids can arise even in this over-extruded situation when the churn effect is severe and the churned material gets folded over, creating unreachable cavities sheltered from being filled during subsequent extrusion passes.

FIGS. 4A-4D depict, in greater detail, varying degrees of fit between adjacent parallel traces (or concentric perimeters in the case of round-walled features) within a given build layer. The varying degrees of contact and resulting fill density shown are attributable to differences in flow rate, meaning the ratio between volume of material discharged per unit lateral motion by the nozzle as it follows a toolpath.

Figure 4A:
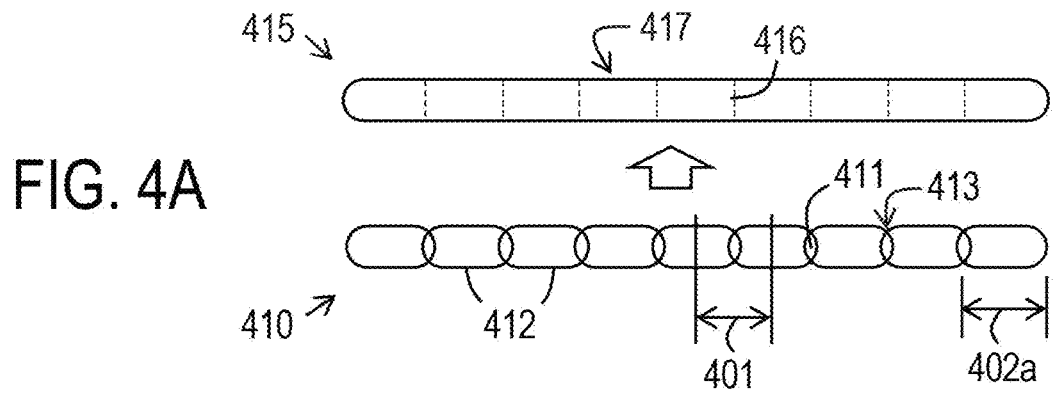
FIGS. 4A-4D depict profiles of deposited beads forming a layer, in which the beads exhibit varying degrees of overlap due to differing flow rates.

FIG. 4A represents a condition of 100% dense filling. A conceptualized cross-sectional view 410 shows slight overlap among adjacent deposited beads 412. The spacing between parallel traces is indicated by dimension 401, which is drawn between centerlines of the beads and is equal to the interval by which adjacent toolpaths are laterally incremented with each pass of the nozzle. The native width of each bead, indicated by dimension 402a, shows the breadth of a bead after being deposited and as slightly flattened into an oval or disc shape either by slight compression between the nozzle and workpiece or possibly by gravity when larger discharge diameters are used. The 'native width' refers to the shape of the bead if it were deposited with no adjacent beads present. Comparing bead width dimension 402a to interval dimension 401, it is evident that the bead width is slightly wider than the interval between traces causing some imaginary overlap 411 to occur between adjacent beads. In reality, the volume implied by the overlap shown redistributes into an interstitial space 413. The net effect, shown in layer section 415, is that the volume represented by potentially overlapping places exactly fills the potential interstitial voids. A resulting upper surface 417 is quite smooth. Dotted lines 416 show approximate boundaries between the material contributed by adjacent traces. (These boundaries might be made visible in a real print by using materials of different colors for depositing adjacent traces.)

Figure 4B:
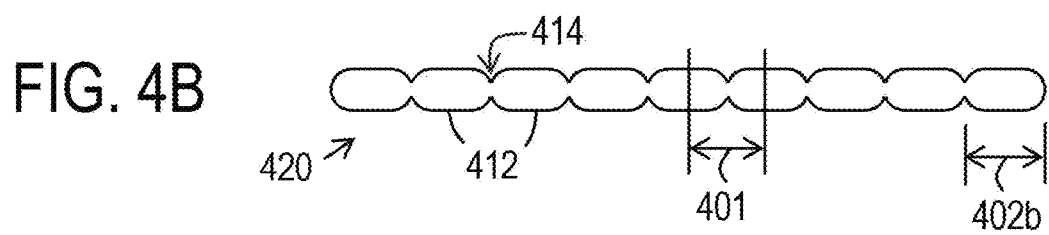

FIG. 4B shows a view 420 as might be formed by reduced flow rate and lesser fill density. In this instance, adjacent traces 412 have enough overlap to make contact and fuse along their edges but not enough material is present to prevent grooves 414 from showing. While grooves 414 are shown in this sketch to illustrate mild under-extrusion, it is possible for even a fully dense deposition pattern to exhibit mild grooves of this nature on the top surface of each layer and for a subsequently deposited layer to sufficiently fill the grooves. If an exact flow rate for 100% fill density can be attained, a fixed degree of grooved appearance is sustainable indefinitely whereas a consistently inadequate extrusion volume leads to a progressive deepening of these grooves over many layers. Bead width dimension 402b to interval dimension 401 are shown to be comparable and bead width dimension 402b is somewhat less than dimension 402a, consistent with using a reduced flow rate compared to FIG. 4A.

Figure 4C:
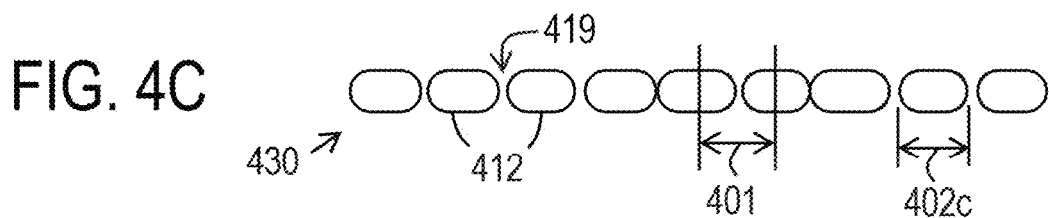

FIG. 4C shows a condition even lower flow rate than in FIG. 4B. In view 430, individual sectioned traces or beads 412 are evident as the bead width dimension 402c becomes smaller than the interval dimension 401. The amount of material deposited to form each bead results in a bead profile that is too narrow to contact an adjacent bead. This leads to the formation of gaps, comparable to crevices shown in FIG. 3C, that expose one or more underlying layers. Indeed, in severely under-extruded conditions, a vertical crevice 419 can be carried through several layers. The centering of traces may also become unstable as a deposited trace may happen to cling to one adjacent trace only to be drawn further away from an oppositely adjacent trace.

Figure 4D:
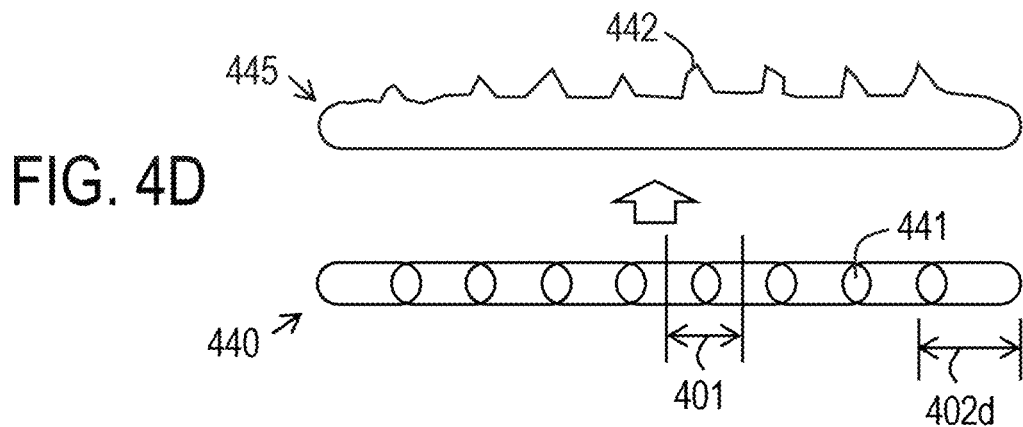

FIG. 4D presents an over-extruded condition, similar to what was shown in FIG. 3D. Conceptual cross-sectional view 440 shows how the outline of the bead shapes overlap significantly, defining overlap region 441 where material deposits would be duplicative. It is evident that bead width dimension 402d is significantly wider than interval dimension 401. As shown in layer section 445, the net effect of applying excess material is a rise in overall layer thickness and the formation of rough disturbances 442 caused when the heated nozzle is forcefully driven through the excess material. In extremely over-extruded cases, the growth of deposited material along parallel traces may outpace the nozzle progress, causing the nozzle to attempt to deposit into a volume that is already filled and consequently ejecting discharged material sideways ahead of the trace currently being deposited by the nozzle.

Figure 5A:
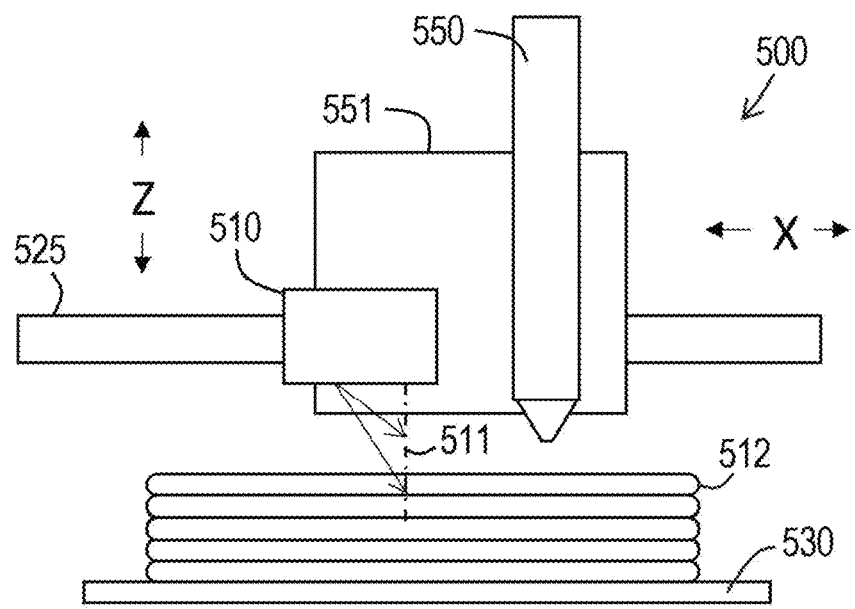
FIGS. 5A-5B depict two arrangements by which a distance measuring tool may be mounted in the vicinity of an extrusion nozzle in accordance with example embodiments of the present teachings.

FIG. 5A shows an arrangement of a laser distance measuring tool 510 as a component of an extrusion deposition system 500 in accordance with an example embodiment of the present teachings. For reference, carriage 551 is coupled to gantry 525 as was portrayed earlier in explaining how carriage 251 is coupled to transverse beam 225 and controllably translated along the beam using motor 124. Any linear actuator components, such as a drive motor, belts, bearings, screws or the like, and any variations thereupon, are represented by gantry 525 for simplicity. As with beam 225 in FIG. 2, gantry 525 is able to be moved in the 'Z' direction by motors or other actuators that are outside the field of view of FIG. 5A. Attached to carrier 551 is an extruder 550 (shown in simplified form) allowing movement along gantry 525, which amounts to movement along an X axis in Cartesian build coordinates. Accompanying extruder 550 on the carriage is laser distance measuring tool 510. This device precisely measures distance between the tool and the surface below which may be, for example, a layer of material that has been deposited by extruder 550 or an initiating surface on build plate 530. One suitable distance measuring tool that uses laser triangulation is Model optoNCDT 1220 available from Micro-Epsilon America in Raleigh, North Carolina, USA. In some embodiments involving a heated enclosure surrounding the build volume, this type of laser device may need to be kept cool such as by the flow of coolant in a closed loop system (already present in some systems 200) or by Peltier-effect thermoelectric cooling.

Several deposited layers are shown as stack 512 which may represent a typical intermediate stage in the construction of an object upon build plate 530.

In the preferred operation, extruder 550 will deposit material in one or more layers, after which measuring tool 510 will be moved over the top surface of the stack 512 (or the build plate or gantry might alternatively be moved in a relative Y direction) so that tool 510 records Z-distance readings as a function of displacement in X or Y axes or a combination thereof. In practice, tool 510 demonstrates a vertical resolution of 1 microns or 0.001 millimeters. Some models of laser distance gage project a narrow laser spot 511 directly downward and sense the laser position using an image sensor viewing the laser from one side. This means that the sensor may not be able to probe deep surface features that obscures the sensor from having line of sight to the laser spot. Some features, such as deep crevices 419 shown earlier, may present challenges to this type of sensor depending on the orientation at which the traces are deposited relative to how the sensor is positioned.

Figure 5B:
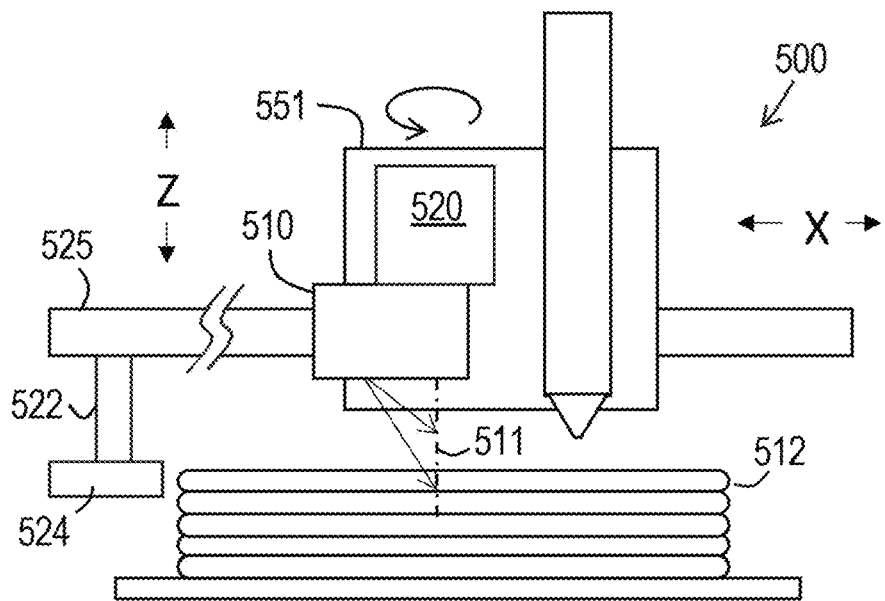

While it may sometimes be possible to select orientation of fill traces in deference to the sensor's orientation, this can be cumbersome and impractical for many additive builds. To resolve this limitation, FIG. 5B presents an alternative embodiment wherein measuring tool 510 is coupled to carriage 551 via a controllable motor or servo 520 which may rotate the sensor around a vertical axis parallel to the Z-axis. This allows the sensor to turn to an optimum orientation for sensing deep surface features, matching whichever orientation was used for depositing the traces. Given the extremely fine distance sensing resolution of the tool, however, the act of rotating the tool may introduce unwanted variations in the vertical position of the tool relative to gantry 525. An additional feature and procedure are contemplated for providing a fixed reference surface plate 524 that may be mounted directly to gantry 525 through a support strut 522. To eliminate temperature-related shifts in the position of the reference surface, surface plate 524 and strut 522 may be constructed of Invar or some other material that minimizes the effects of temperature changes. With surface 524 available as a reference, tool 510 may compare its readings among different rotational orientations and apply any needed correction offsets, allowing the sensor to accommodate any orientation of deposited traces without sacrificing resolution when gathering distance readings of deposited layer stack 512. Another possible reason for providing a reference surface as shown is to compensate for temperature-dependent variations in the distance measuring tool itself. This may allow for less costly measurement devices to be used, especially where build chamber temperature may vary considerably during actual use.

Although FIGS. 5A-5B depict a specific laser distance measuring tool 510, it should be made clear that other optical and non-optical measuring devices may be used. Alternative laser-based methods may project laser radiation at a different angle or may use interferometric measurements. Some laser-based instruments may interpret a field of interference patterns formed as the laser impinges on the measured surface. Still other optical techniques may employ multiple wavelengths, beam triangulation, focal plane measurements or 2D image capture, for example. Still other, non-optical alternative profile measuring tools may utilize sonic or ultrasonic waves, physical proximity or contact probing, sound cavity resonance effects, capacitance sensing or other techniques. Furthermore, although a specific model of laser distance measuring tool featuring a resolution of 1 micron has been successfully used in reduction to practice, other models or types of measuring tools having different distance resolution may prove adequate feedback for closed-loop control of flow rate. Alternative resolutions may be in the range of 200 microns or less, 100 microns or less, 50 microns or less, or any other values subsumed within these ranges.

Figure 6:
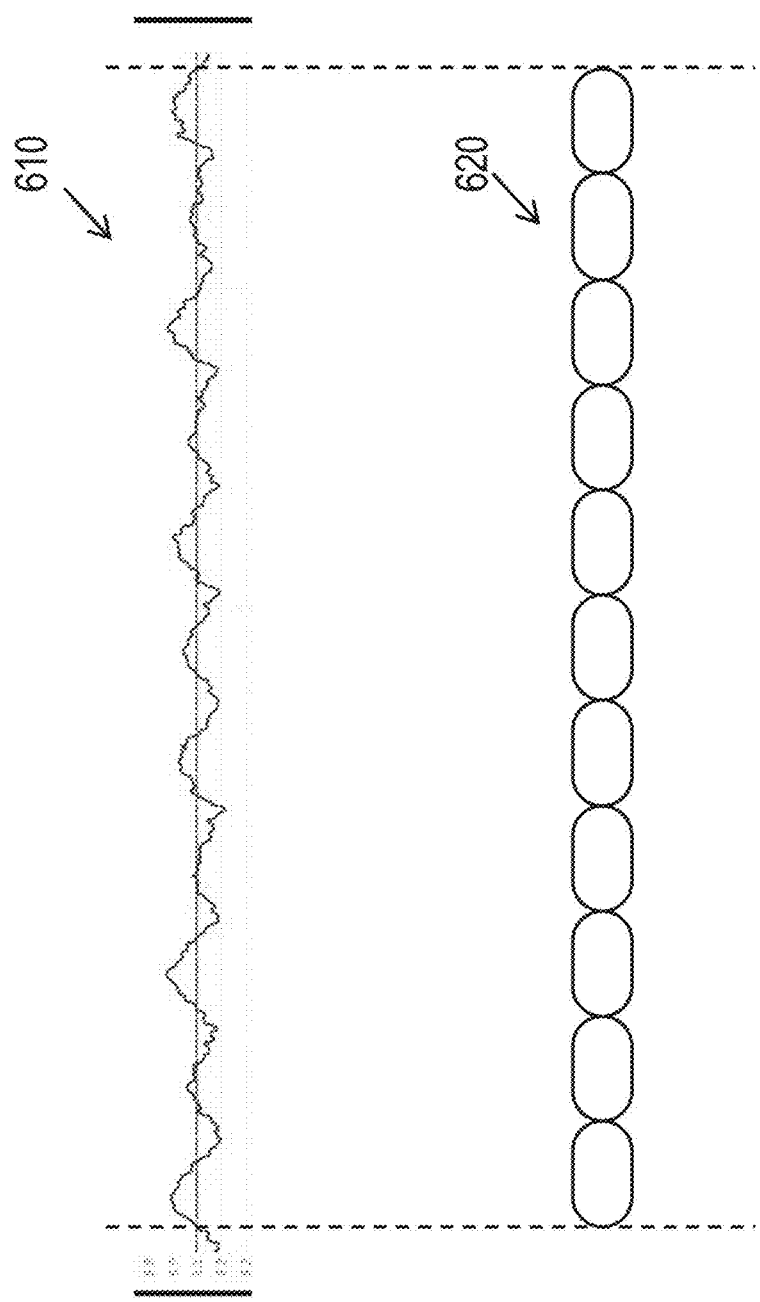
FIG. 6 shows an example plot of distance measurements as a function of lateral scan position in accordance with example embodiments of the present teachings.

FIG. 6 shows a plot 610 of distance measurements taken from a distance sensing tool 510. Underneath plot 610 is a drawing showing an expected outline 620 of deposited traces based on toolpath information. In other words, outline 620 is a nominal, idealized section similar to what was shown in FIGS. 4A and 4B. The actual distance measurements of plot 610 appear very coarse but are actually very amplified in the vertical direction and not intended to mimic, on scale, the top face of idealized outline 620. In accordance with preferred aspects in implementing the present teachings, it may be observed that the periodic rise and fall in plot 610 aligns with the beads of deposited traces represented in outline 620. As will be explained, forehand knowledge of exact locations of toolpath vertices expressed in build space coordinates can be used to plan where tool 510 is directed to scan the surface of a deposited layer of material. In particular, the endpoints of an optical scanning pass will preferably be calculated to encompass a whole number of anticipated bead widths. (Note that plot 610 records distance while passing across a distance of eleven full bead widths.) To reduce measurement noise that might be introduced by reading partial bead profiles or by disregarding the effects of this alignment altogether, optical scans are preferably calculated to go from bead boundary to bead boundary. Alternatively, additional mathematical manipulations may be implemented to account for partial bead widths encompassed during a scan.

Figure 7A:
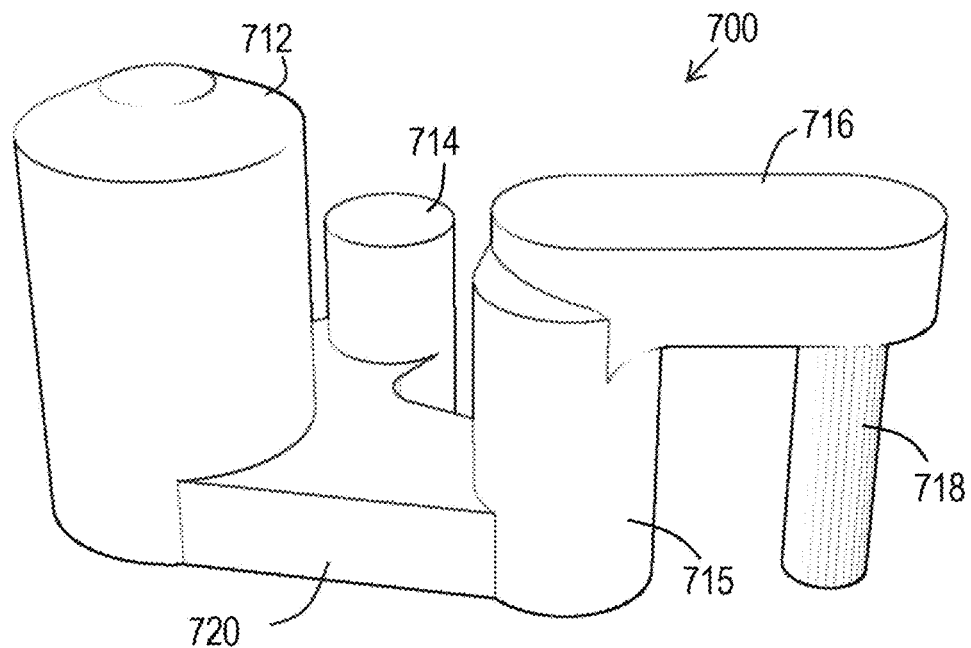
FIGS. 7A-7B are perspective renderings of an example solid object that may be constructed using an extrusion deposition system.
Figure 7B:
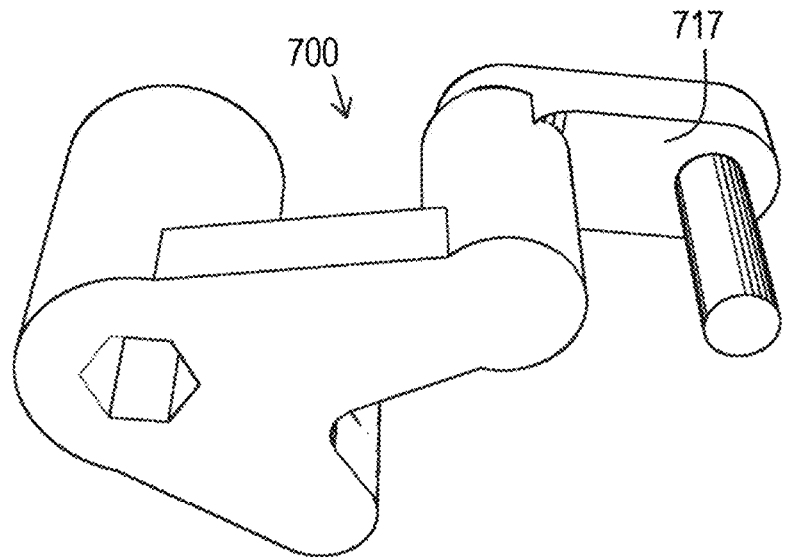

For illustrative purposes, a perspective view of an example object to be formed is shown as part 700 in FIG. 7A, in an upright position with the direction of build progression oriented towards the top of the page. Part 700 comprises a cylindrical first post 712 and a somewhat smaller second post 714. Part 700 also comprises third post 715 that connects to arm 716 that, in turn, supports the top end of shaft 718. All three posts 712, 714, 715 are conjoined by a base portion 720. The underside of part 700 is shown in the tilted view of FIG. 7B, revealing an overhang area 717 which will require support from underneath as part 700 is formed.

For the purposes of demonstration, post 712, post 714 and base 720 will be designated as requiring precise 100% fill density and will be subject to fine closed-loop control in accordance with some aspects of the present teachings. The upper portion of post 715, as well as arm 716 and shaft 718 will require multiple perimeters to form a shell but will only require a sparse infill, such as a grid pattern of regularly spaced extrusion deposits. For these latter members, fine closed-loop control may be applied selectively to the shell perimeters as these elements are built up. These varying densities will have been specified by a designer of the part and may be input as build parameters during a slicing operation or other stage of nozzle toolpath calculation.

Figure 8:
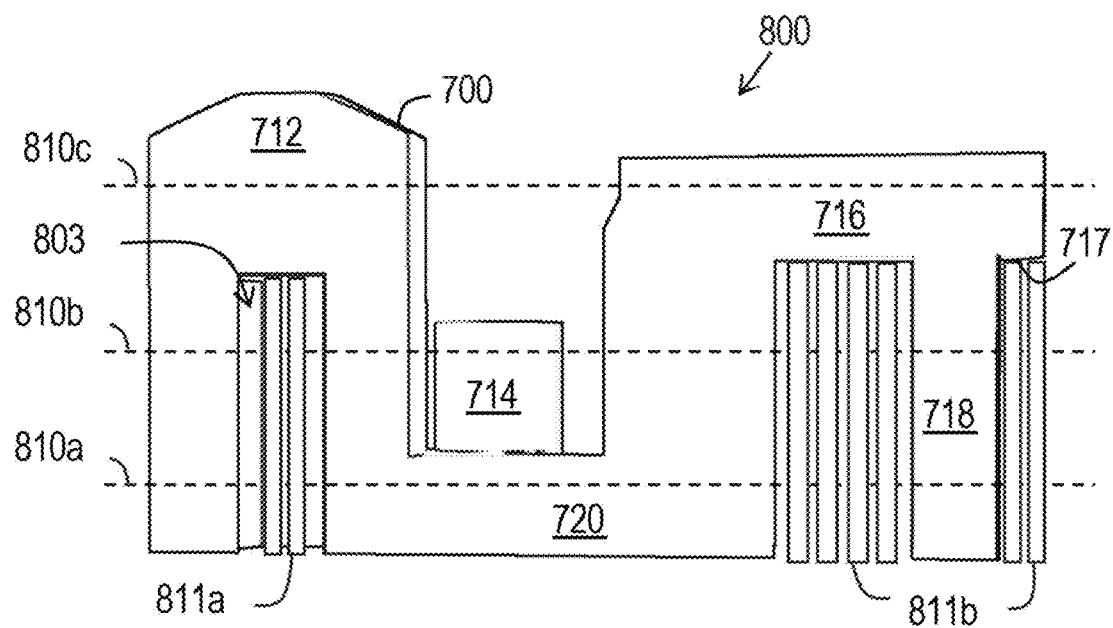
FIG. 8 presents a view of a vertical section through a model of the example solid object introduced in FIG. 7A.

Derived from the part shape depicted in FIG. 7A, FIG. 8 shows part 700 in an approximate vertical cross-sectional view 800. (Note that this is a view through the model of the object, not an actual cross-section of the finished object which will have sparse infill in some places. For clarity, cross-hatching has not been applied to the diagram.) Superimposed on view 800, three horizontal lines correspond to various stages or slices at various elevations during the build. Slice lines 810a, 810b and 810c represent planar build layers intersecting the part's modeled shape at elevations of 15%, 45% and 80% of the part's overall height, respectively.

Figure 9A:
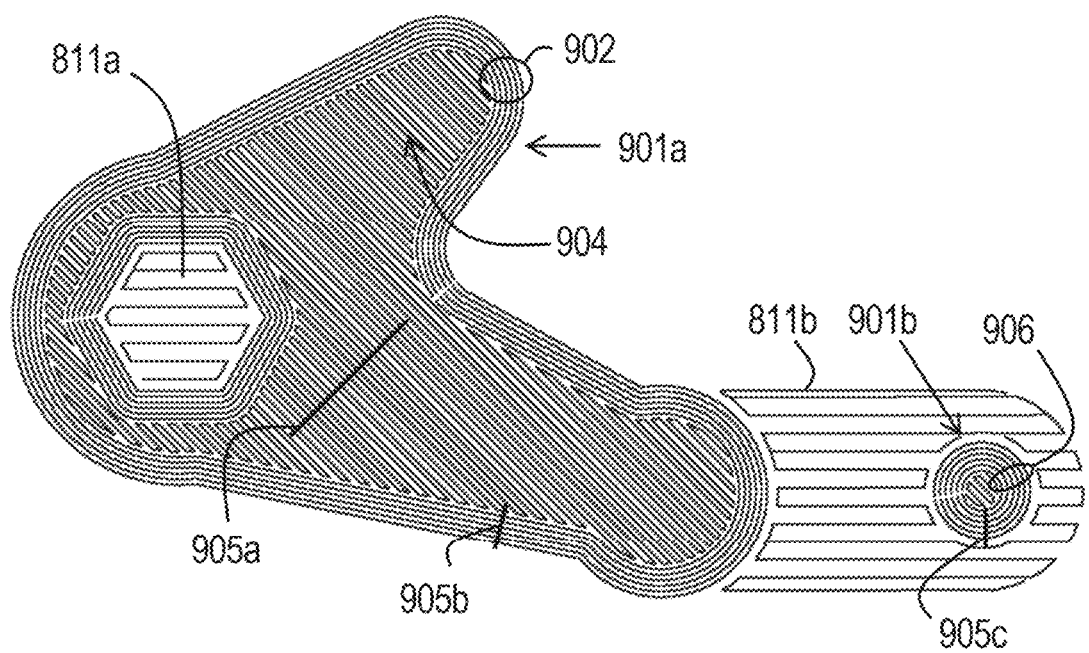
FIGS. 9A-9C depict layer toolpaths, at different layer heights, calculated for the example solid object introduced in FIG. 7A.
Figure 9B:
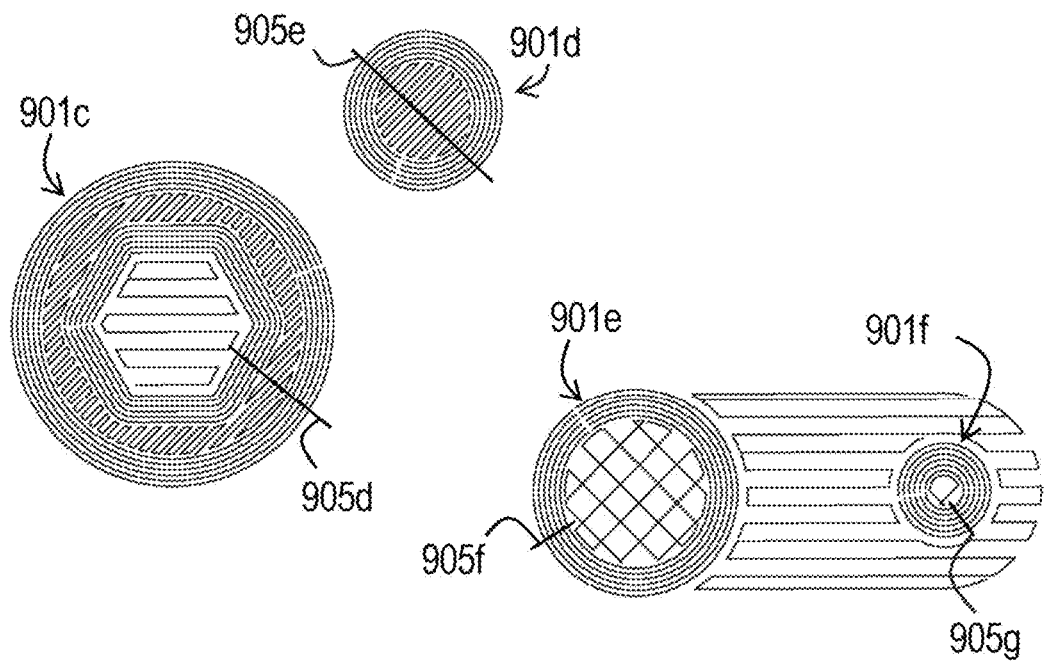
Figure 9C:
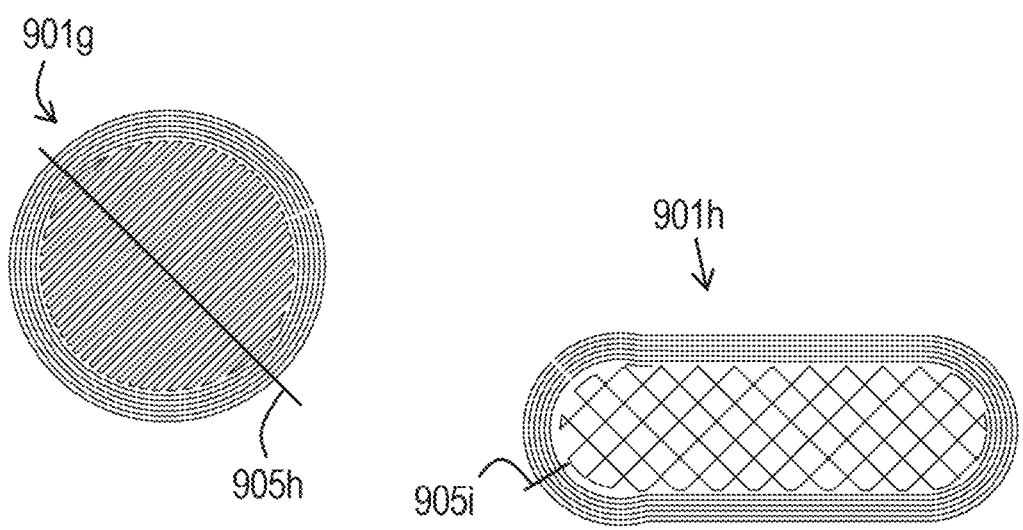

In coordination with these slice lines, FIGS. 9A-9C depict planar toolpaths calculated at each elevation, to show varying polygon counts, features, and fill densities. As these circumstances change with elevation, the measures set forth herein adapt to provide variable numbers of control loop instances when and where needed.

In FIG. 9A, the effect is shown of layer slice 810a, at approximately 15% of the overall part height, intersecting part 700 mainly across base portion 720, forming a first contiguous region 901a, and through shaft 718, resulting in a second region 901b. To direct a nozzle to deposit material that will fill these regions for the given layer, a series of outer perimeters 902 are seen to form the outer shell of the part (for region 901a) and infill traces 904 are laid closely alongside one another by moving a nozzle in a zig-zag or boustrophedon pattern to achieve a nominal 100% density. Closed-loop control of flow rate for perimeters 902 and infill traces 904 according to the present teachings may be applied throughout the construction of base portion and may be carried forth as the profile of part 700 transitions to multiple separate posts.

Within second region 901b, a set of outer perimeters 906 and more sparse infill traces 9808 are evident. Within this region, the perimeter traces 906 may alone be subject to closed-loop control without including sparse infill traces 811b. This may be true throughout the construction of shaft 718.

FIG. 9A also shows sectioning through the traces added for support material, such as support traces 811a supporting the top of cavity 803 and support traces 811b supporting overhang surface 717. Such supports are typically removed at some time after the part is completely built.

An example scanning toolpath 905*a* is shown as a line segment superimposed on region 901*a* and is one of many possible locations where a distance scanner may be directed over the layer after traces of material have been deposited following along the toolpaths shown. Scanning toolpath 905*b* is an example scanning toolpath for controlling perimeter layers only. Scanning toolpath 905*c* pertains to scanning of the perimeters forming shaft 718.

FIG. 9B shows a toolpath layer calculated at 45% of the part height, corresponding to slice line 810*b* in FIG. 97 intersecting the modeled shape of part 700. At this elevation in the build axis or Z axis, a planar slice intersects the model of part 700 well above the completion of base portion 720 and forms four isolated regions 901*c*, 901*d*, 901*e*, and 901*f* which correspond to post 712, post 714, post 715 and shaft 718, respectively.

Within region 901*c*, post 712 continues with fully dense infill and is subject to closed-loop control. Whereas larger post 712 is approximately halfway through its construction at this level, post 714 (region 901*d*) is nearing its completion. Scanning toolpath 905*d* is shown as a single pass to intersect dense infill and multiple outer perimeters, but in some implementations these features may be separately sampled. Outer perimeters may require special logic to avoid scanning where infill lines overlap outer wall perimeters. To assure a strong bond between a multi-perimeter outer wall and either dense or sparse infill, many slicer applications allow for a configurable degree of overlap between the infill traces and the innermost one of the wall perimeters. When implementing a highly precise closed-loop control according to the present teachings, it is recommended that the innermost perimeter, due to overlap with infill traces, be excluded from a distance scanning toolpath. Similarly, where support structures, such as support 811*b*, are in close proximity to controlled perimeters, such as perimeter traces 906, care must be taken to select a scanning toolpath that avoids distance sampling of the support traces. Scanning toolpaths 905*e* and 905*g* pertain to regions 901*d* and 901*f*, respectively.

FIG. 9C shows a set of toolpaths calculated for a slice elevation corresponding to slice line 910*c*, at about 80% of part height. At this level, post 714 has already been completed and post 715 and shaft 718 are conjoined by arm 716, so only a single region 901*h* persists. Region 901*h*, formed by arm 716, remains in a sparse infill state and is still subject to closed-loop control of outer perimeters.

Post 712, as indicated by region 901*g*, comprises perimeters and fully dense infill. Note that scanning toolpath 905*h* may need to shift as post 712 tapers down to a flattened pinnacle. Within region 901*h*, scanning toolpath 905*i* may carry forth as a continuation of scanning toolpath 905*f*. Where possible, it is preferred to select a scanning toolpath location that can persist over a large number of layers and feature changes and provide longer continuity of closed-loop control. If, for example, scanning toolpath 905*f* had been oriented at a four o'clock position relative to region 901*e*, then this scanning toolpath would have to be altered or abandoned once the construction of arm 716 commenced.

From FIGS. 9A-9C, it is apparent that sample part 700 comprises vertical members and, depending on slice elevation and the build progression axis, exhibits varying numbers of isolated regions where material would need be to be deposited. Furthermore, as was mentioned, the fill density was specified differently for different portions of the part, and some portions may be formed by mostly straight deposited traces whereas others may be formed by concentric curved traces. Some portions of part 700 are quite divergent in size, such as post 712 in comparison to shaft 718, and may require different recoat times in view of material cooling behavior. As shown in FIG. 8, part 700 comprises overhang feature 717 that may necessitate the use of support structures 9711*b*. One common practice is forming supports from a secondary material that can be dissolved way from a main build material that is being used to build the part. The secondary material in such instances will typically be deposited by an entirely separate extruder acting within the same build environment. In fact, with or without supports, some parts are designed to be constructed using multiple extruders.

All of the above scenarios may benefit from implementing separate instances of closed-loop control of flow rate when part features result in isolated regions, such as 901*c,d,e,f* shown in FIG. 9B. As a part is progressively constructed by layers of deposited material, some isolated regions will emerge mid-build as the layer count increases and some regions will terminate or merge into others. Consequently, the number of closed-loop control instances may change as the build processes. Each closed-loop control instance may be active over a given range of layer elevations.

Figure 10:
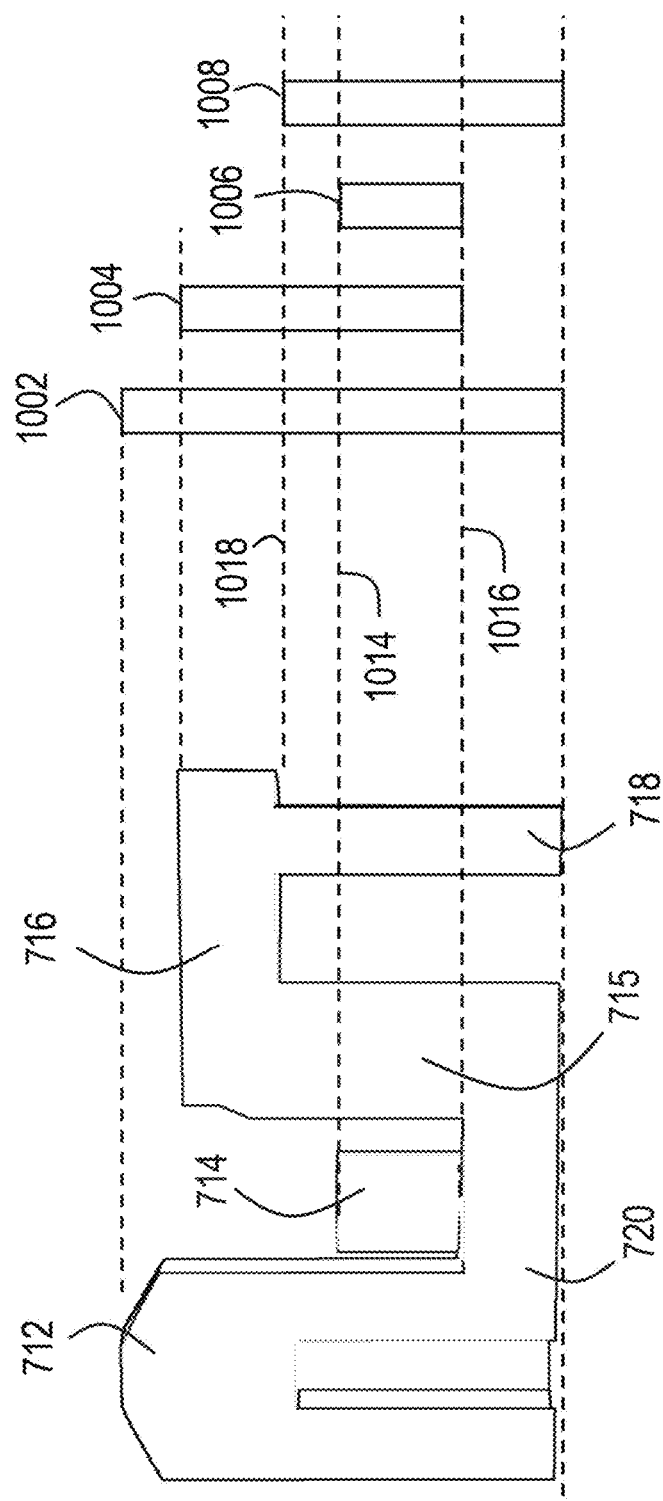
FIG. 10 depicts layer ranges over which closed-loop control instances may be valid during construction of the example solid object introduced in FIG. 7A in accordance with example embodiments of the present teachings.

To illustrate this concept, FIG. 10 shows how different members of part 700 may give rise to control loop instances that are valid over specific ranges of build layer height or layer count.

A closed-loop control instance (CLCI) refers to a set of data needed to maintain 'layer-to-layer persistent' state information and calculate correction values based on measured response values. As distance scanning tool produces a set of measurements after a layer has been deposited, this data is compared to measurement results from at least one previous layer, processed using a control algorithm having certain coefficients and then used to calculate and record a next layer flow rate value. As explained above, multiple separate closed-loop control instances may be appropriate for optimum control of isolated regions. These CLCI data sets will be instantiated within a computing environment of an extrusion deposition system each time that a given object or part is being additively constructed.

A closed-loop control instance may comprise one or more of the following data fields: a distance between an optical scanner and the deposited material, a measured thickness of the deposited material, a target fill density, a closed loop control tolerance value, a number of extrude traces to be sampled, coordinates for sampling extruded traces, difference distance value, target distance value, flow rate correction value, a Kp coefficient to be multiplied by a difference distance value for calculating a flow rate correction value, a cumulative error value accumulated over multiple scanned layers and a Ki coefficient to be multiplied by the cumulative error value for calculating a flow rate correction value.

A closed-loop control instance may optionally comprise an identifier field to associate with a given region or part feature and to distinguish it from other CLCI. Alternatively, the application or operating system of the additive system may access different CLCI data sets on the basis of memory location or some other index or addressing scheme.

Another persistent datum that may either be included within a CLCI or maintained separately is the current prevailing flow rate for a given region or feature. This value may be retrieved and applied as the additive system begins to deposit a subsequent layer of material within a region associated with the CLCI data.

The creating and maintaining of separate instances implies that, at any given moment during the build process, a first instance (such as CLCI 1002) and second instance (CLCI 1004) may have different values for at least one of these data fields. This allows for features of the part to be separately scanned and precisely controlled to a desired target value that yields an overall high-quality finished part as specified.

In FIG. 10, four different CLCIs are depicted to signify the layer ranges over which they are applicable. Also observed in this depiction is that the number of active CLCI varies as the build progresses. A first CLCI 1002 spans the entire range of layer heights within the build and allows for continuous control of the 100% fill density specified for base 720, initially, and for post 712 from bottom-to-top. As the build is commenced, a separate region formed by shaft 718 (see region 901f in FIG. 9B), having significantly different area and fill density requirements, warrants the creation of separate CLCI 1008. This instance remains valid and active until reaching the build level at which shaft 718 conjoins with arm 716, as indicated by dotted line 1018. Above this level, shaft 718 is no longer identifiable as a separate region and becomes subsumed, in a sense, within region 901h as shown in FIG. 9C which is already subject to continuity of control via CLCI 1004. CLCI 1004 is newly instantiated or activated upon reaching build level indicated by dotted line 1016. This is the level at which solidly filled base 720 is completed and post 715 emerges with a more sparse infill. CLCI 1004 persists until post 715 and then arm 716 are built and should be used to control perimeter construction in contrast to the solid fill control being managed using CLCI 1002.

CLCI 1006 corresponds to controlling density within post 714 as it emerges after the construction of base 720 and then completes at a level indicated by dotted line 1014. Even though post 712 and post 714 are both specified to be deposited at 100% fill density and the data within CLCI 1002 is already assuring fine control of flow rate for post 712, separate CLCI 1004 is associated with post 714 because of differences in feature size, radius of perimeter curvature and recoat time constraints that could create different extruder pressure and other conditions influencing optimum flow rate.

Although not shown in FIG. 10, other CLCI could be declared for support structures if they were to be subject to closed-loop control. It is expected that support structures, being generally sparse, single-walled and intentionally poorly coupled, would be less likely to utilize closed-loop control.

Figure 11:
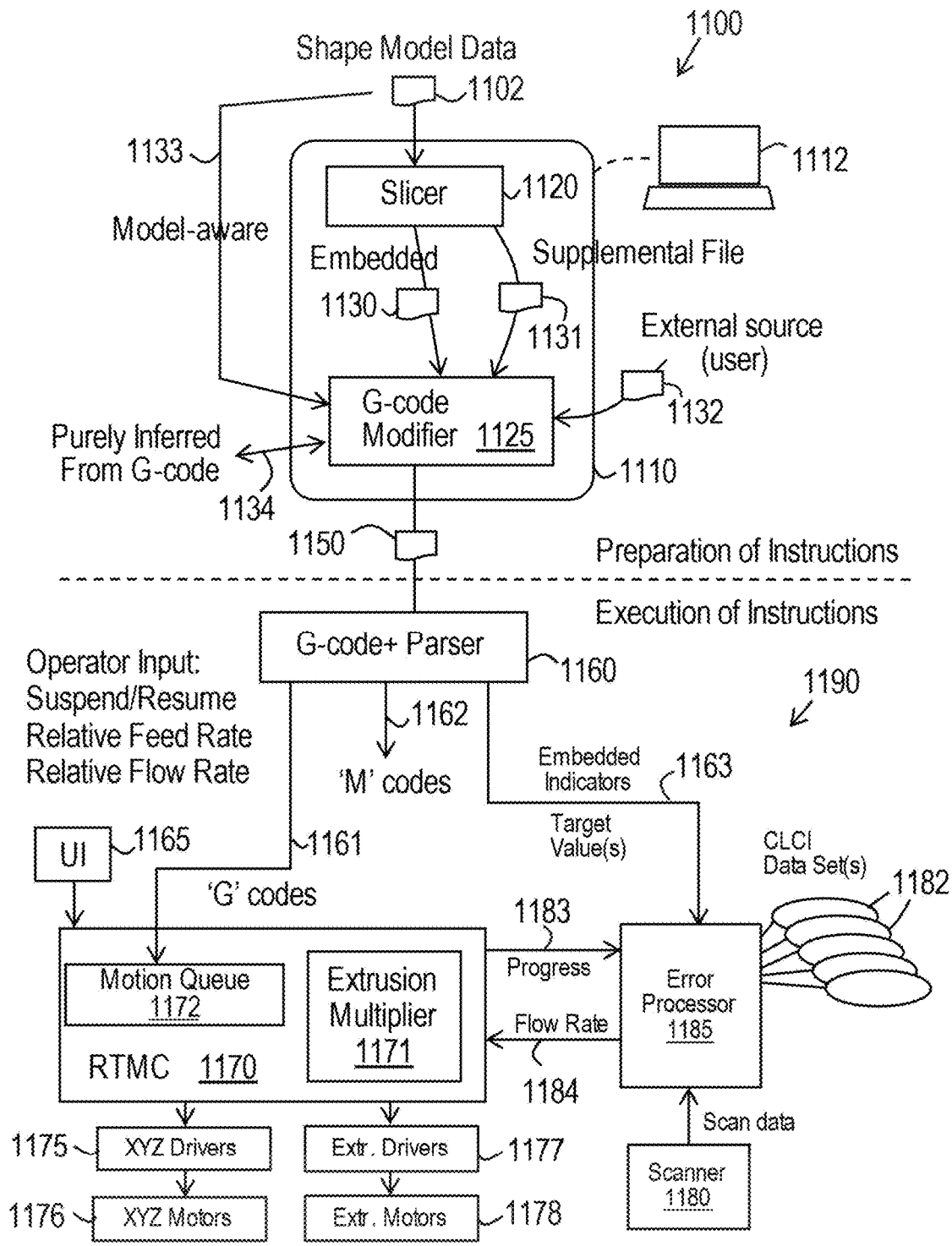
FIG. 11 is a conceptual block diagram of both physical and logical components involved in phases of preparation and execution of instructions by which an extrusion deposition system constructs a given object using closed-loop flow rate control in accordance with example embodiments of the present teachings.

FIG. 11 presents a conceptual block diagram 1100, showing both physical and logical components of an extrusion deposition process, to explain stages of preparing and then executing instructions when implementing closed-loop flow control in accordance with principles described herein. The upper portion of block diagram 1100 pertains to preparing a set of commands that direct an extrusion deposition machine ('3D printer') to construct an object, from a supply of build material, in accordance with a data model that describes the shape of the object. The lower half of block diagram 1100 pertains to receiving, interpreting and acting upon the set of commands which, in accordance with the present teachings, may include imbedded metadata or other aspects not traditionally found in sets of printer commands. As will be described, many circumstances relevant to implementing closed-loop flow control may be recognized while slicing or otherwise transforming shape model data 1102 into discrete toolpath data for controlling nozzle movements. A set of commands 1150 preferably comprises, either as a self-contained package or in an accompanying file, additional data that signals key information to an extrusion deposition printer in support of closed-loop control during the build process.

A computing platform of a 3D printing system is primarily designed to interpret and act on G-code instructions that have been pre-calculated by a separate slicing engine. Rather than further burdening this same computing platform with recognizing attributes of part's modeled shape, prompting a user for input and deciding where to perform surface scans, the division of tasks between pre-build preparatory steps and build-time execution depicted in FIG. 11 is preferred. A more opportune time to assess whether model-dependent attributes warrant creating one or more closed-loop control instances is during the previewing and slicing of a model file to generate G-code motion instructions.

FIG. 11 shows a preparation environment 1110 which acts to assemble a sequence of commands for controlling a 3D printer to form a specified object. As shown, preparation environment 1110 may comprise a slicing engine, slicer 1120, as an application hosted on a computer workstation 1112 or the like. Shape model data 1102, formatted as an STL file or other suitable format, is provided to a preparation environment 1110 such as by reception of a data file over a communication network or retrieval of a data file from a data storage device.

Conventionally, a user would load a shape model data 1102 into a slicer 1120, manipulate the shape model in a visualization environment shown on a display of computer workstation 1112, adjust certain parameters of the slicing operation and then engage the slicer to compute toolpaths which are generally output in the form of a list of G-code instructions ready to be conveyed to a printer and executed.

However, as taught herein, it is during the slicing operation and generation of toolpath instructions that the desire to invoke closed-loop control can be expressed by user input, such as through a user interface presented via computer workstation 1112. Furthermore, the slicing action affords the earliest opportunity to detect that some build layers will intersect the shape model in a way that forms multiple, isolated polygonal regions. For reasons explained in connection with FIGS. 9A-9C, this partitioning of printed portions may create a need to maintain multiple separate control loop instances and exercise independent flow rate control for different regions across the build layer or different features of the part. The detection of separate regions while preparing toolpath instructions may translate to adding adjunct passages of G-code instructions to the output produced by slicer 1120.

Furthermore, in support surface scanning using a distance measuring tool, the set of toolpath instructions that would conventionally be issued from slicer 1120 are augmented by the action of G-code modifier 1125 in accordance with preferred embodiments of the present teachings. In the recommended arrangement wherein the scanner is moved by the same carriage that moves an extrusion nozzle, G-code modifier 1125 inserts G-code commands and imbedded comments to instruct extrusion deposition system to pause printing and perform the scanning motion. A typical, commercially available slicer 1120 will not already have this functionality, though it is contemplated that a future slicer version could be enhanced to support or incorporate aspects of the present teachings.

Within the role of preparatory environment 1110, slicer 1120 and G-code modifier 1125 collectively determine where, in terms of both layer counts and build space coordinates, closed-loop control is to be applied and then encode, within or alongside the body of G-code instructions, additional motion instructions and other data fields that direct a printer to correctly implement closed-loop control when a build process is performed.

Figure 12:
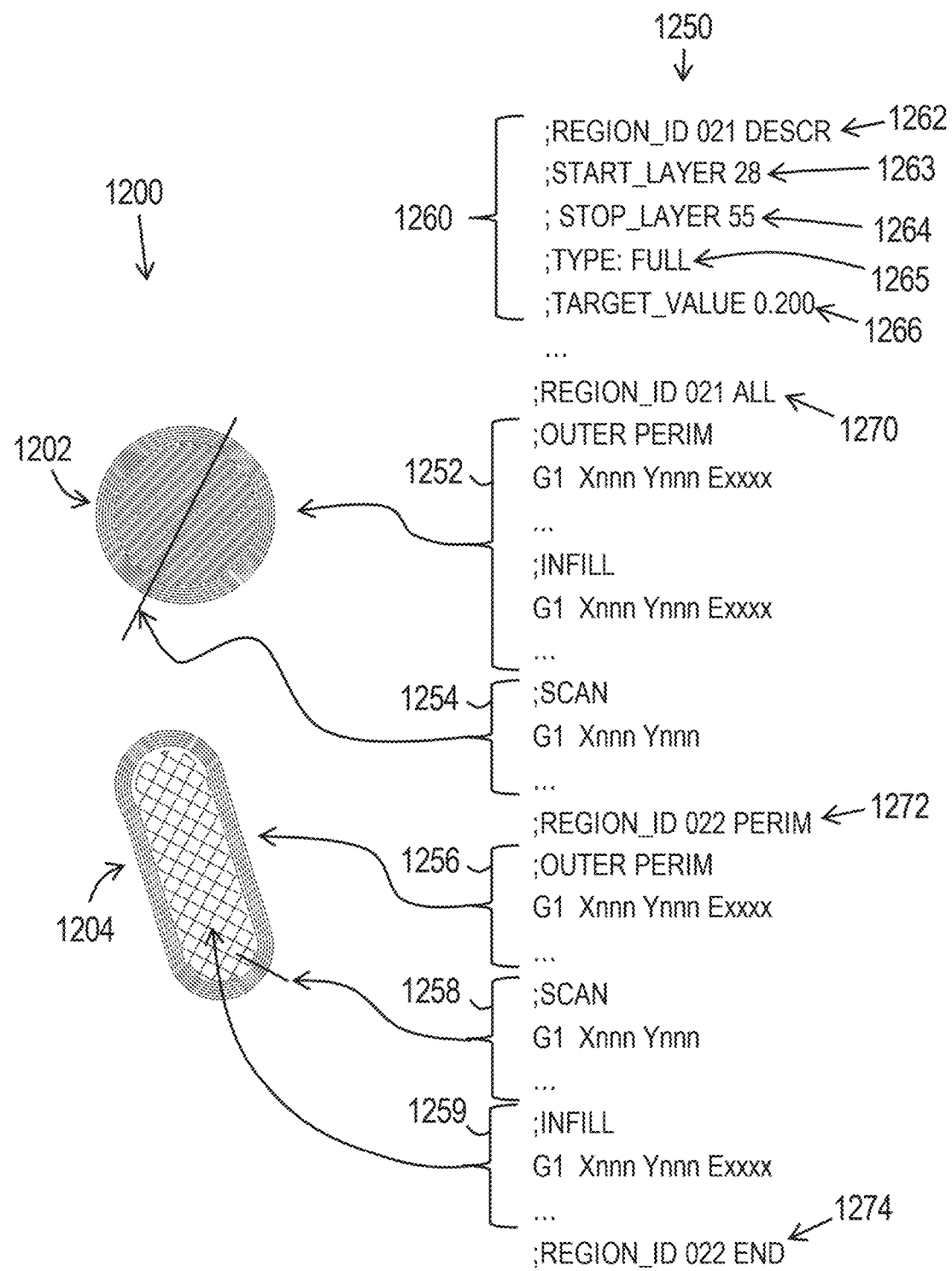
FIG. 12 is a diagram of a layer toolpath and a corresponding instruction listing indicating adjunct passages that have been inserted in accordance with example embodiments of the present teachings.

Complementing the explanation provided by FIG. 11, FIG. 12 illustrates how isolated regions within layers may be represented as added fields, comment lines or other modifications applied to a G-code file. FIG. 12 presents a sketch 1200 of an example set of layer toolpaths (resembling FIG. 9C) in which two distinct regions of material deposits, region 1202 and 1204, are evident. Alongside sketch 1200, a condensed listing of G-code instructions, list 1250, is provided in which specific passages correspond to identified portions of the toolpaths in sketch 1200. For example, a first G-code passage 1252 may comprise instructions for depositing perimeters and infill traces that form a layer in region 1202. Many slicing engines insert comment lines such as ";OUTER PERIM" or ";INFILL" to indicate what printed feature is expressed by the lines that follow. (Note that, in typical G-code syntax, any line that begins with a semicolon is regarded as a comment rather than a instruction line and will be ignored by motion control functions.) What typically follows are many 'G1' movement instructions, though an ellipsis is shown here in place of dozens or hundreds of instruction lines. G-code passages 1256 and 1258 may encode the toolpaths for the perimeters and sparse infill pattern within region 1204. Prior to an implementation according to the present disclosure, a typical output from a slicing engine would simply be a concatenation of passages 1252, 1256 and 1259 to form a pattern of material deposits, without closed-loop control of flow rate, that resemble sketch 1200.

Beyond these typical passages, various degrees of implementation of the present teachings account for additional comment lines and passages presented in list 1250. In accordance with a first implementation in which closed-loop flow control is applied uniformly across a layer without differentiation for isolated regions, list 1250 may include a passage 1254 directing the recording of scanner distance readings as the motion system moves the scanner spot over the workpiece. As described elsewhere herein, the data from the scan is processed to calculate a corrected flow rate for use in subsequent printing. When one scan per layer is deemed to suffice, then only one such passage 1254 needs to be inserted, such as by a G-code modifier function, per layer. One or more additional lines, such as line 1266, may be inserted earlier in the G-code to express a target value, such as a distance from scanner to deposited layer for use in a closed-loop control algorithm.

In accordance with a more extensive implementation, in which isolated regions are to be independently closed-loop controlled, list 1250 may additionally comprise region declaration passage 1260, scan passage 1258 (specifically for region 1204) and region-demarcating lines 1270, 1272, 1274. One or more region declaration passages 1260 may be inserted early in a G-code listing to enumerate regions and to describe significant attributes of each region. Useful attributes may include a target distance value 1266 or a layer range over which a closed-loop control instance (CLCI) for the region will be active, as was explained in connection with FIG. 10. In example region declaration passage 1260, an identifying header 1261 denotes the start of a region declaration and assigns a locally unique identifier ('021') by which the region may be referenced later in the instruction set. Following header 1261, comment lines 1263 and 1264 may express, respectively, a lowest layer number and highest layer number for which the region known as '021' will be applicable. An optional 'type' field 1265 may indicate whether the nature of closed loop control fully encompasses perimeters and solid infill or is applicable only to perimeters. A 'target value' line 1266 may express the target value, such as a distance value, that closed-loop control will seek to maintain through successive layers to form region '021'.

The declaration of regions in a body of G-code may be inserted during preparation of instructions (upper part of FIG. 11) and then utilized by an extrusion deposition system during a build process (lower part pf FIG. 11) in allocating a suitable number of CLCI data sets 1182. A process within the system, such as error processor 1185, may manage the creation and utilization of data sets 1182 based on the descriptors found in declaration passages 1260. The managing process may, at the outset of a build process, create, allocate or initialize all datasets that will be needed throughout the build and then involve them in control algorithm calculations as their respective layers are being constructed. Alternatively, a CLCI managing process may dynamically create CLCI data sets only when certain layer counts are reached or as new declarations are encountered between passages of movement instructions within the G-code.

Once region declaration passages 1260 have enumerated and described regions, subsequent delimiter lines 1270, 1271, 1272 may be interspersed to associate G-code passages with specific regions.

For example, delimiter line 1270 indicates, until further notice, that G-code passages 1252 and 1253 are in the context of region '021'. This has two important effects. First, as the extrusion deposition system deposits traces of material according to passage 1252, a relative flow rate to be applied will be retrieved from a specific CLCI data set 1182 that has been allocated for region '021'. This finely controlled flow rate will often be the result of having scanned and analyzed a previous build layer, if any, within region '021'. Secondly, when scanning data is acquired by executing the instructions in passage 1253, the distance data obtained will be tallied specifically as to region '021' and the corrected flow rate will be calculated using data and parameters from CLCI data set 1182 allocated for the context of region '021'.

Further down, delimiter line 1271 identifies a different region '022', such that subsequent passages are in the context of region '022' and region '021' is no longer applicable. Delimiter line 1272 indicates the end of passages relevant to region '022' and may further indicate that closed-loop control is no longer applicable or region-differentiated as subsequent instructions are carried out.

Having presented FIG. 12 to describe the intended contents of output file 1150, the explanation now returns to how these contents are assembled in the upper part of FIG. 11.

Various approaches are contemplated for coordination between components within environment 1100 to achieve the intended result. As one contemplated scheme, slicer 1120 may, in the course of calculating mathematical intersections of build planes with the model data and the generating polyline perimeter toolpaths, insert imbedded comment lines to demarcate passages of G-code that form separate, isolated portions within a build layer. Slicer 1120 may assign identifiers to these isolated regions and include the identifiers in imbedded tags or comments. Upon receiving the G-code version with these imbedded indicators, as represented by labeled arrow 1130, G-code modifier 1125 may read the imbedded comments, examine the G-code passages, determine whether closed-loop control is applicable, calculate the orientation and location for surface scanning passes and then insert instructions that carry out the scanning motion.

Additional metadata may also be inserted by either slicer 1120 or G-code modifier 1125 that expresses the total count of isolated regions for the current layer and their identifiers, the maximum count of isolated regions that will be encountered throughout the build, desired fill density in a given region, control loop parameters such as Kp, Ki, etc.

In a slightly different approach, the identification of isolated regions, demarcation of G-code passages and added metadata may be generated by slicer 1120 and provided via a supplemental data file 1131 rather than being encoded within the G-code, per se. In parallel with the intake of an unmodified G-code file from slicer 1120, G-code modifier 1125 would simply read and interpret supplemental file 1131 while taking action similarly to what was described for the imbedded data.

In any of the above schemes, the recognition of different regions and encoding of data related to those may either be fully automated, may involve user interaction and approval, such as while a user is reviewing the model within a visualization environment of a slicer application, or may be fully manual in which the user may perform one or more of explicitly defining the regions, providing region identifiers, planning the scanning paths and setting control loop parameters.

As an example of the latter manual option, the detection and identification of regions subject to closed-loop control may be authored by a user and provided as a script or configuration file 1132. This approach may be especially useful when a series or batch of similar parts or versions of a part are to undergo slicing but the same regions or same parameters are to be applied.

In yet another approach, signified by labeled arrow 1133, slicer 1120 produces a relatively unmodified G-code output and G-code modifier 1125 is also provided with the original shape model data. Equipped with this information, G-code modifier 1125 may take on the tasks of identifying isolated regions, in addition to deciding scan paths and inserting comment tags relating to the number of regions and instantiation of control loops. Slicer 1120 may be any conventional slicing engine without requiring significant modification in function.

Placing even further functional responsibility on G-code modifier 1125, another scheme, represented by labeled arrow 1134, involves G-code modifier 1125 receiving G-code that has not been analyzed or tagged for closed-loop control. G-code modifier 1125 may infer the presence of isolated regions purely from the G-code instructions and without additional external cues from slicer 1125 or an end user.

Any of these functions in a preparatory context may be hosted on computer workstation 1112 or on a separate platform in communication with workstation 1112. Slicer 1120, G-code modifier 1125 and any other logic functions or stages within preparation environment 1110 may be hosted, either simultaneously or asynchronously, within a single computer or distributed among several computers that collectively host the preparatory environment. The actions of the preparatory phase depicted in the top half of diagram 1100 may be executed in continuous succession or may result in intermediate stored data files, formed at different times and being accessed and processed by data processing entities that are physically or logically scattered.

The lower portion of diagram 1100 describes components and actions pertaining to an extrusion deposition system that receives G-code instructions that have been compiled by the preparatory functions just described.

Some components shown are typical of extrusion deposition systems and may not require any augmentation or functional modifications to support implementing the present teachings. These include three-axis motion drivers 1175 and motors 1176 and one or more extruder drivers 1177 and motors 1178. Analogous components were described in connection with FIGS. 1 and 2 and the number, configuration and type pf the controlled motion components may vary. Drivers 1175 and 1177 receive command signals from real-time motion controller 1170 in the form, of low power pulses or numerical position commands and effectively issue electrical signals with sufficient power to cause motors, such as stepping motors or servo motors, to physically move parts of the system.

Some components may require only slight adaptation. Real-time motion controller (RTMC) 1170 will mostly perform the same general task of timely outputting coordinated pulses or commands to multiple motor drivers but may or may not need slight changes in logic flow to ensure that changes in flow rate are responsive down to the level of single point-to-point toolpath segments. In many existing systems, RTMC 1170 may comprise a buffer or instruction queue 1172 in memory, partly for the purpose of performing 'lookahead' logic for managing acceleration and deceleration. The point at which an extruder incrementation value is calculated based on a given amount of lateral toolpath travel, and further taking into account any relative flow rate set at the printer via a user interface 1165, may differ among various firmware that could be executing in RTMC 1170. In other words, any granular flow rate corrections needing to be applied to a specific movement instruction in accordance with the present teachings should be recognized soon enough to take action on the specific instruction rather than taking effect many instructions later due to queuing distance.

As with most existing extrusion deposition systems, a set of G-code instructions in the form of a data is received and interpreted by a G-code parser. Movement instructions (generally lines starting with a 'G' character) are diverted (see arrow 1161) and queued up in movement queue 1172 while other comments, non-movement commands (such as 'M' codes) and directives are recognized and applied to other purposes such as controlling temperatures and fan speeds (see arrow 1162). In FIG. 11, a modified G-code parser 1160 handles 'G' and 'M' commands as just described but is also configured to recognize and segregate data within the G-code files 1150 that has been augmented with data relevant to closed-loop control as described above. This embedded or associated data is conveyed or communicated (see arrow 1163) to error processor 1185. Error processor 1185 may interpret the CLCI-descriptive data parsed from the G-code file and responsively create one or more CLCI data sets 1182. Where isolated regions are to be independently flow-controlled, error processor 1185 may manage the creation and activation state of multiple CLCI data sets, as might be the case for CLCI 1002-1008 described in FIG. 10.

Scanner 1180 shown in FIG. 11 refers to a distance sensing tool 510 as described in FIG. 5A. As explained earlier, a set of G-code commands and comment fields may have been encoded during the preparatory actions that will cause the scanner to begin gathering distance readings while the motion system moves the point of scanning in a path across the printed part. (See, for example, scanning toolpath 905*d* in FIG. 9B.) This action will gather data resembling plot 610 introduced earlier.

Figure 14:
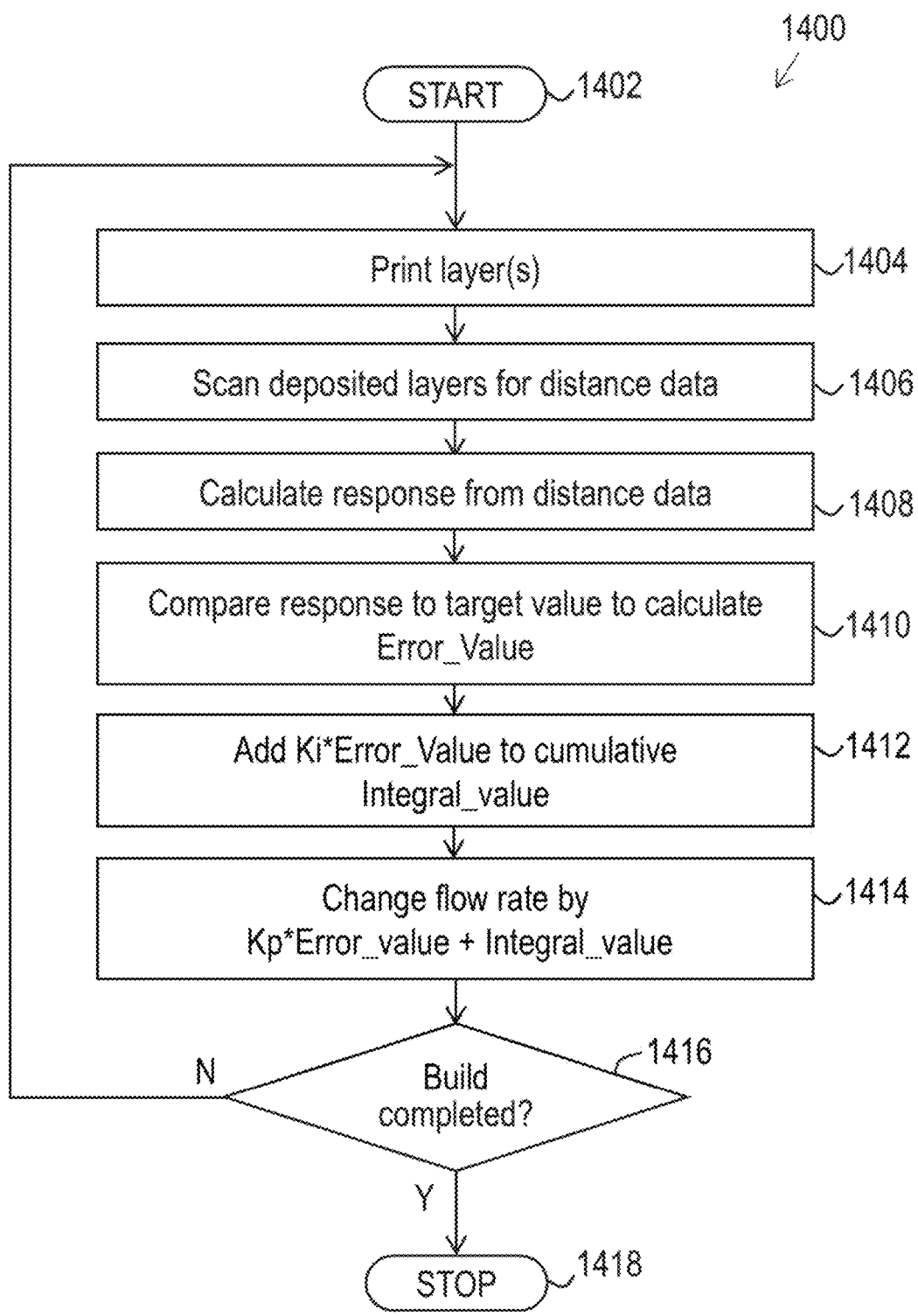
FIG. 14 is a flowchart of a process executed by an extrusion deposition system to form a solid object responsive to a set of instructions which includes instructions supporting closed-loop control of flow rate in accordance with example embodiments of the present teachings.

Upon completing the movement and gathering distance data, a process that will be described in FIG. 14 is performed by error processor 1185 to average (or otherwise digest) the scanned distance data, draw upon data within a select data set 1182 and calculate a corrected flow rate. The corrected flow rate is stored in memory and invoked during printing of the next build layer. In implementations that support separate control of isolated regions, the corrected flow rate will have been calculated in the context of a particular region and the corrected flow rate will be stored in a selected CLCI data set 1182 assigned to the region.

Extrusion deposition system 1190 comprises a user interface 1165, analogous to user interface 150 or user interface 264 shown earlier. During execution of a build process, an operator of system 1190 is typically able to exercise some control and change generalized parameters even as material is being deposited. An operator, acting through user interface 1165, may suspend and resume the build process as is sometimes useful for intervening and resolving minor issues. An operator can adjust the feed rate, generally meaning the speed at which the machine is running. Even though the G-code instructions will specify a feed rate and may call for mid-build feed rate changes, the operator's control of feed rate will serve to scale all programmed feed rate values. The operator's feed rate value, normalized to 100%, can be used as a multiplier value applied to the programmed feed rates. Similarly, an operator can adjust flow rate during a build process, which acts by multiplying the operator's input times the programmed amounts of extruder movement. Extrusion multiplier function 1171 is shown to represent this activity which controls the ratio between G-code-specified extruder movements and the actual incremental movement signals sent to extruder drivers 1177. In accordance with some embodiments of the present teachings, flow rate adjustments may also be received from error processor 1185 as indicated by arrow 1184. Error processor 1185 must know when specific layers or regions are being printed in order to timely communicate corresponding flow rate adjustments. Referring back to FIG. 12, as the system begins depositing material according to passage 1252, the error processor must be informed that the G-code parsing process has encountered line 1270 so that it can retrieve a corrected flow value from a particular data set 1182 and update extrusion multiplier function 1171 with a flow value to be applied until further notice. As one way to achieve this synchronization, a progress indication may be communicated from parser 1160 (such as along the pathway shown by arrow 1163) or from RTMC 1170 as indicated by arrow 1183. This progress indication may be implemented, for example, by communicating a 'next-to-execute' G-code line number from the motion queue that can be correlated to line numbered region-relevant G-code lines that were diverted to error processor 1185 by parser 1160. Alternatively, if motion queue 1172 is of minimal distance or delay, then the reading of region delimiter lines and movement 'G' codes may be sufficiently contemporaneous to properly synchronize flow rate updates with depositing actions.

Other techniques for coordinating between material depositing actions executed by RTMC 1170 and flow rate corrections from error processor 1185 are possible, such as by RTMC 1170 echoing XY locations of toolpath points and having the error processor look up and compare XY boundaries to identify a region being printed. The XY boundaries for regions may have been expressed earlier in the G-code via region declaration passages.

Error processor 1185, CLCI data sets 1182, and scanner 1180 represent novel components added in accordance with exemplary embodiments of the present disclosure.

One role of G-code modifier 1125 or collectively among functions within preparation environment 1110 is determining coordinates for a linear scanning pass. This requires information about nozzle toolpaths to determine the nominal locations for a set of adjacent traces that are to be sampled, such as beads 620. The locations of beads should preferably allow for scanning an integer number of bead widths, for reasons described earlier in connection with FIG. 6. Furthermore, in an implementation shown in FIG. 5B, the rotational orientation of parallel beads may be known, inferred or specified within preparation environment 1110. In a Cartesian coordinate system in which the building of layers progresses along the Z axis, parallel traces may be aligned with an X axis, aligned with an Y-axis or may lay at any angle between these orthogonal orientations. An XY slope or an azimuth (preferred) would provide numerical values expressing rotational orientation. As explained in FIG. 5B, some distance sensors will exhibit a preferred orientation to obtain valid readings for steep features like deep crevices. The mechanism of FIG. 5B provides for turning the distance sensor to best match the orientation of traces at a given location. This implies that the rotational orientation of traces must be known, that G-code statements or instructions are then added to control the action of motor 520 to move the sensor into the correct rotational orientation and that additional G-code statements or instructions will also provide for performing the post-rotation calibration procedure made possible by reference surface 524.

Figure 13:
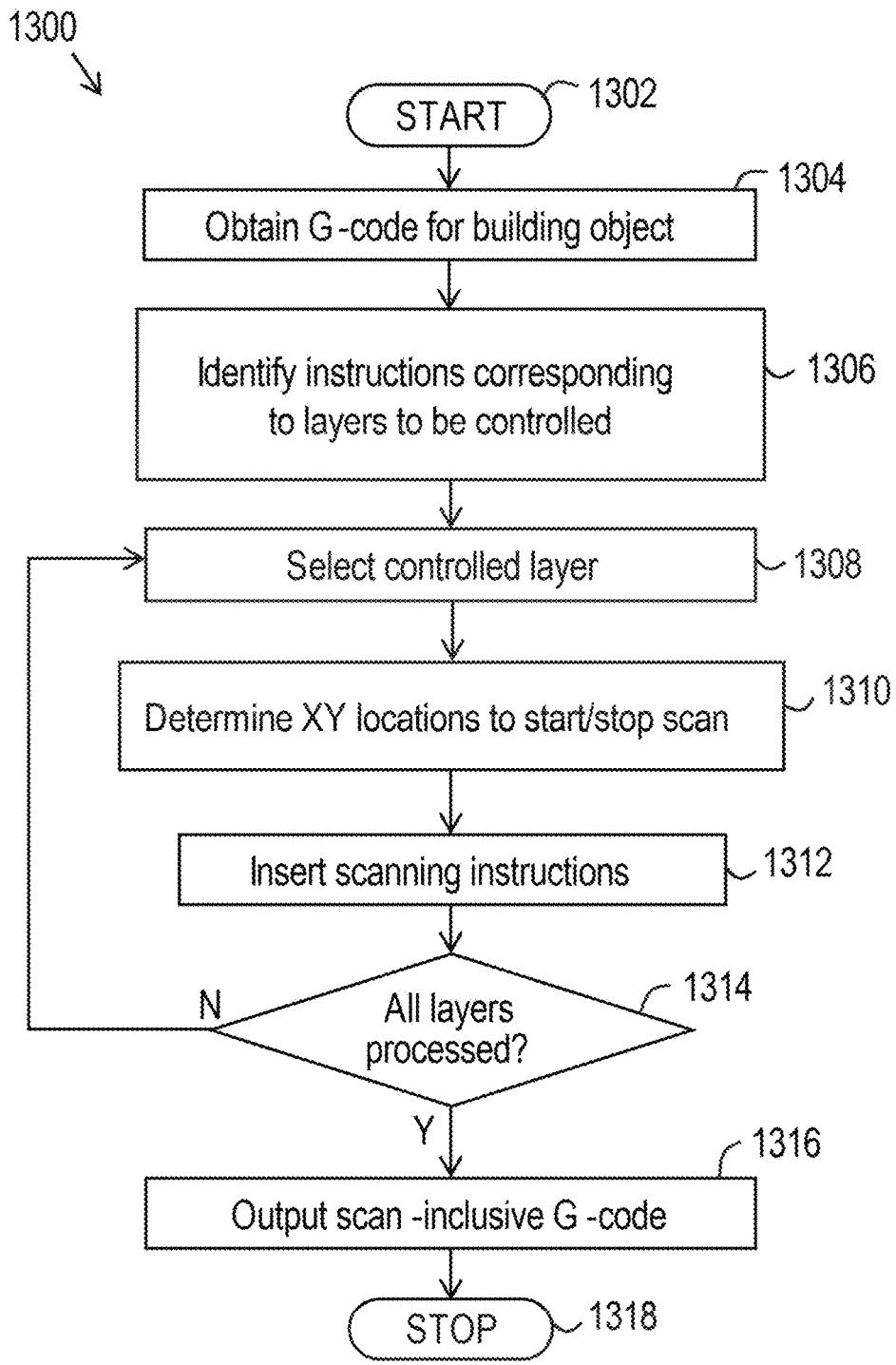
FIG. 13 is a flowchart of a process for preparing instructions to direct an extrusion deposition system to form a solid object, including instructions supporting closed-loop control of flow rate in accordance with example embodiments of the present teachings.

FIG. 13 is a flow chart of a process 1300 for preparing a set of build instructions for forming an object by extrusion deposition, including aspects in accordance with embodiments of the present teachings.

The initiation of process 1300 is represented by step 1302 upon the need to include scanning instructions and, optionally, closed-loop control metadata in a set of movement instructions by which an additive manufacturing system will be directed to form a solid object based on a model representing the object's shape.

Upon initiation of process 1300, execution immediately proceeds to step 1304 to obtain a base set of G-code instructions, or the like, for forming the object. Step 1304 may either refer to the act of performing a slicing operation to derive layer-wise toolpath instructions from the digital data model of the object's shape or to the act of receiving the toolpath instructions as a data set resulting from a slicing operation that has been performed previously or in a different processing context than the current invocation of process 1300. In either case, one form of common slicing operation involves calculating a geometrical intersection between a tessellated object model and a series of planes, corresponding to planar build layers, to generate a set of polylines describing the outer contour of the object. A typical slicing operation then generates a series of perimeter toolpaths paralleling the outer contour polylines and infill toolpaths for either sparsely or densely adding material, depending on user settings, to occupy the interior space encompassed by the outer perimeters. Some forms of slicing operations or toolpath calculating schemes may support non-planar and non-horizontal layers, in which case the object model may be intersected with non-planar lamellar shapes.

As is, the base set of toolpaths, which may be formatted as G-code instructions for example, would cause a material-depositing nozzle to move appropriately within a build environment and accomplish forming the solid object in conformance with the model. These instructions will typically be in the complete, self-contained form ready to be dispatched to an additive manufacturing system.

Once such a set of toolpath instructions is obtained in step 1304, then step 1306 is performed to parse and partition the toolpath instructions into separate groupings pertaining to each build layer and to identify those instruction sequences for which a closed-loop control will be applied. In a first example case, a 100% fill density may be specified for an entire part or object to be constructed. Each layer or every nth layer may need to be scanned and analyzed to provide fine control of flow rate and assure the fill density is carefully controlled as the build proceeds. In a second example case, a user may specify a lesser infill density for the overall part but require that the perimeters be subject to fine closed-loop control. In a third example case, a user may specify a range of layers over which closed-loop control is to be applied whereas other layers are not to be controlled in this manner. In a fourth example case, a user may specify partitions, either by identifying part features or selecting portions within a set of toolpaths for a sliced layer, as either being subject to full closed-loop control of perimeters and infill, being subject to closed-loop control of perimeters only or to be deposited at a fixed flow rate without closed-loop control.

In all four of these example cases, a user may use an application or edit a configuration file on workstation 1112 to input settings or to define regions or volumes of the build where closed-loop control is to be applied. Alternatively in some cases, the invocation of closed-loop control may be inferred or automatically applied based on interpreting the content of the motion instructions. For example, a given set of one or more layer-wise groups of instructions may exhibit a pattern of infill traces that are parallel and spaced at intervals roughly equal to the nozzle diameter. Furthermore, the extruder motion instructions, generally expressed in cubic millimeters of discharge, may be compared to the layer height and lateral motion within a given instruction to determine whether the deposition rate is intended to achieve 100% density. Responsive to detecting these attributes within G-code instructions or the like, a portion of the G-code may be deemed suitable for closed-loop control without user intervention, though the user may provide more general input as to allowing this automated invocation or the user may be informed when closed-loop control has been automatically applied.

Step 1308 works in connection with step 1314 to assure that steps 1310 and 1312 are performed for all layers that were determined, in step 1306, to involve closed-loop control. It should be noted that, alternatively, the action of step 1306 could be performed between steps 1308 and 1314, effectively evaluating the instructions for each build layer in sequence and conditionally acting upon each build layer that involves any aspect of closed-loop flow control. The present teachings are not limited to one or the other of these alternative approaches.

Step 1308 acts to select a group of motion instructions that pertain to a build layer, such as a build layer subject to closed-loop flow control as determined by the action of step 1306. The group or range of sequential toolpath instructions selected in step 1308 serves as a context for steps 1310 and 1312.

Step 1310 determines, or performs a lookup of, specific coordinates by which motion actuators within the additive manufacturing system will move a gantry, platform or tool head to which a scanning device (such as scanner 1180) is coupled. In accordance with an example embodiment, a laser spot scanner is used for measuring distance between the scanner and the surface of a layer of deposited material and is coupled to the same motion platform or carrier as a material depositing extruder. In this configuration, the scanner remains in a fixed position relative to the extruder nozzle and does not require additional motion actuators or encoding of additional motion axes.

In a preferred implementation, the starting and stopping location of a scan, generally expressed as XY coordinate pairs in a Cartesian coordinate system wherein the build surface is in an XY plane and layers of material are applied by incrementing away from the build plate in a Z direction are chosen with consideration of toolpaths in the G-code instructions and the extent of closed-loop control being applied. Referring to FIG. 12 as an example, the action of step 1310 corresponds to calculating start and stop endpoints that will result in instruction passage 1254 being added to accomplish a scan across region 1202. In configurations providing for rotating a distance sensing tool as shown in FIG. 5B, step 1310 may also involve analyzing the orientation of the toolpaths and generating instructions that will rotate and calibrate the tool before the scanning motions.

Step 1320 pertains to inserting or appending the appropriate instructions into the G-code in the same manner as passages 1254 and 1258 were shown to have been inserted within list 1250.

Once all layers have been processed, as determined in step 1314, then the flow of execution is diverted to step 1316 wherein the assembled G-code, or other suitable list of instructions, is output, stored or transmitted for subsequent use by an extrusion deposition system. This output corresponds to output file 1150 as shown in FIG. 11. Step 1316 may also entail inserting other data, such as a target value or any other fields that have been described for CLCI contents or will otherwise be relevant to closed-loop control when the build process is performed. Process 1300 then concludes at step 1318 and an instruction file has been prepared that includes added scanning instructions in support of closed-loop control of flow rate. Process 1300 may execute as part of preparation environment 1110 introduced in FIG. 11 and may be hosted in, for example, computer 140 shown earlier.

FIG. 14 depicts process 1400 which may operate within an extrusion deposition system to implement closed-loop flow control using data or instructions that have been added to a G-code file by process 1300, or the like, during slicing and other preparatory creation of instructions. Process 1400 accomplishes algorithmic control of flow rate across a build layer. Although process 1400 does not address separate control of possible isolated regions, it does illustrate the same control methodology that will be applied for each control loop in multi-region implementations. (FIGS. 15 and 16 will address independent control of multiple regions.) Process 1400 may be useful for builds that only involve a single columnar structure or for which isolated regions are presumed to be deposited with adequate uniformity.

Process 1400 is initiated when a build process is started and continues as the build progresses. Thus, step 1402 relates to starting a build process when at least a layer-wide control of flow rate is enabled.

Execution then proceeds to step 1404 in which a single layer may be deposited or, in some variations, several layers may be deposited in succession between scanning passes. The toolpath instructions will generally be similar to passages 1252, 1256 or 1259, which are of the type produced by a conventional slicing operation independently of the present teachings.

Once the prescribed layer or layers have been printed, step 1406 is undertaken by the system moving according to scanning instructions that resemble passage 1254 in FIG. 12 and have been inserted by the action of step 1312 in process 1300. The resulting raw scan data may resemble plot 610 in FIG. 6.

Acting upon the distance data obtained in step 1406, step 1408 involves calculating a 'response' from the data, which may be an average distance across the entire scan but may also be standard deviation, peak-to-peak, root-mean-square amplitude, Fourier analysis or any other suitable measure derived from the data. While not imposing a limit on the range of control measurements and control methodologies that may be employed within the scope of the disclosure, it is envisioned that the target value will often be a desired distance between the distance sensing tool and the surface of a layer that has been most recently deposited during a build. The distance data from the scan may be averaged to yield, as a system response, a single scalar number as a distance value to be compared to the desired target distance value. This comparison occurs in step 1410 to calculate an 'Error_Value' which is essentially a measure of how far the system response (distance measured after the latest layer) differs from the desired target distance.

Steps 1412 and 1414 amount to using a proportional-integral (PI) control algorithm to calculate a corrected flow rate that should cause the next layer to achieve an average distance closer to the desired target. Kp and Ki are the customary symbols for a first factor that is multiplied by the most recent error value and for a second value to be multiplied by error values and applied to a cumulative sum generated from all previous error values. Step 1412 reflects carrying a running sum of a term comprising Ki times the Error_Value, which means that system responses from previously scanned layers can influence subsequent control calculations. Step 1414 then combines the cumulative integral term with a proportional term expressed as Kp times the Error_Value. Careful selection of values Kp and Ki (known as 'tuning') can generally provide a corrective control signal that will cause the system to converge on the desired response efficiently (within a minimum number of deposition/measurement cycles) and without overshoot or oscillation.

Steps 1404 through 1414 are performed for a given layer, or after the system deposits multiple layers if the scanning samples are not performed for every layer. (For example, infill traces having layer-alternating directions may motivate measuring every second layer.) Step 1416 determines whether all layers have been deposited and, if not, redirects execution to print the next layer by returning to step 1404. Otherwise, process 1400 and the associated overall build process concludes in step 1418.

As an optional provision in some embodiments, process 1400 may include certain procedures to allow for settling upon a stable and sustainable average target value while initial layers of a build are being deposited. Very often, the initial layers of a build process are visually observed and flow rate is manually adjusted as the early part of the build process is carried out. With respect to the PI control algorithm prescribed herein, these potentially wide fluctuations in flow rate could cause overcompensation swings, long settling times or other anomalies as manual and automatic flow adjustments (and possibly other sources of perturbations) interfere with each other. To improve the establishing of nominal flow rate settings among initial layers and then smoothly transitioning to automatic flow control as taught herein, it is recommended that, along with averages calculated in step 1408 for example, a standard deviation among a given number of previous layer averages is also calculated and that automated control implemented in some or all of steps 1410-1414 be suspended until the multi-layer standard deviation among the averages falls below a given threshold.

For example, in one implementation, upon completion of each successive layer, an average distance measurement is compared with that of five other of the most recent layers to calculate a standard deviation over six successive layer averages and the PI control algorithm remains disengaged from exercising flow rate control until this standard deviation falls below 0.03. Of course, the average distance measurement may also be replaced or augmented by any of the other measurements enumerated above for step 1408 and the standard deviation may be replaced by any other measure of central tendency. It is contemplated that a user interface for a system 100 or system 200 may provide a display or indicator that the automatic flow rate control is 'locked out' initially, such as by red coloration or greying out of a button control by which the user would activate automated flow control. As the initial layers of a build process are completed and the user has made any coarse manual adjustments to flow rate and the measured averages have become consistent enough to meet the standard deviation criteria, the user interface may show the button control to be colored green, not greyed out or otherwise may active for the user to invoke automated flow control. Alternatively, automated flow control may be automatically engaged when successive measurement averages have met the standard deviation criteria. A user interface may include an indicator that the criteria for engagement have been met or that that automatic flow control has been engaged. A user interface may additionally present numerical values indicative of average measurements, standard deviation calculated or a user threshold setting for the standard deviation criteria, which may or may not be user adjustable through the user interface.

Figure 15:
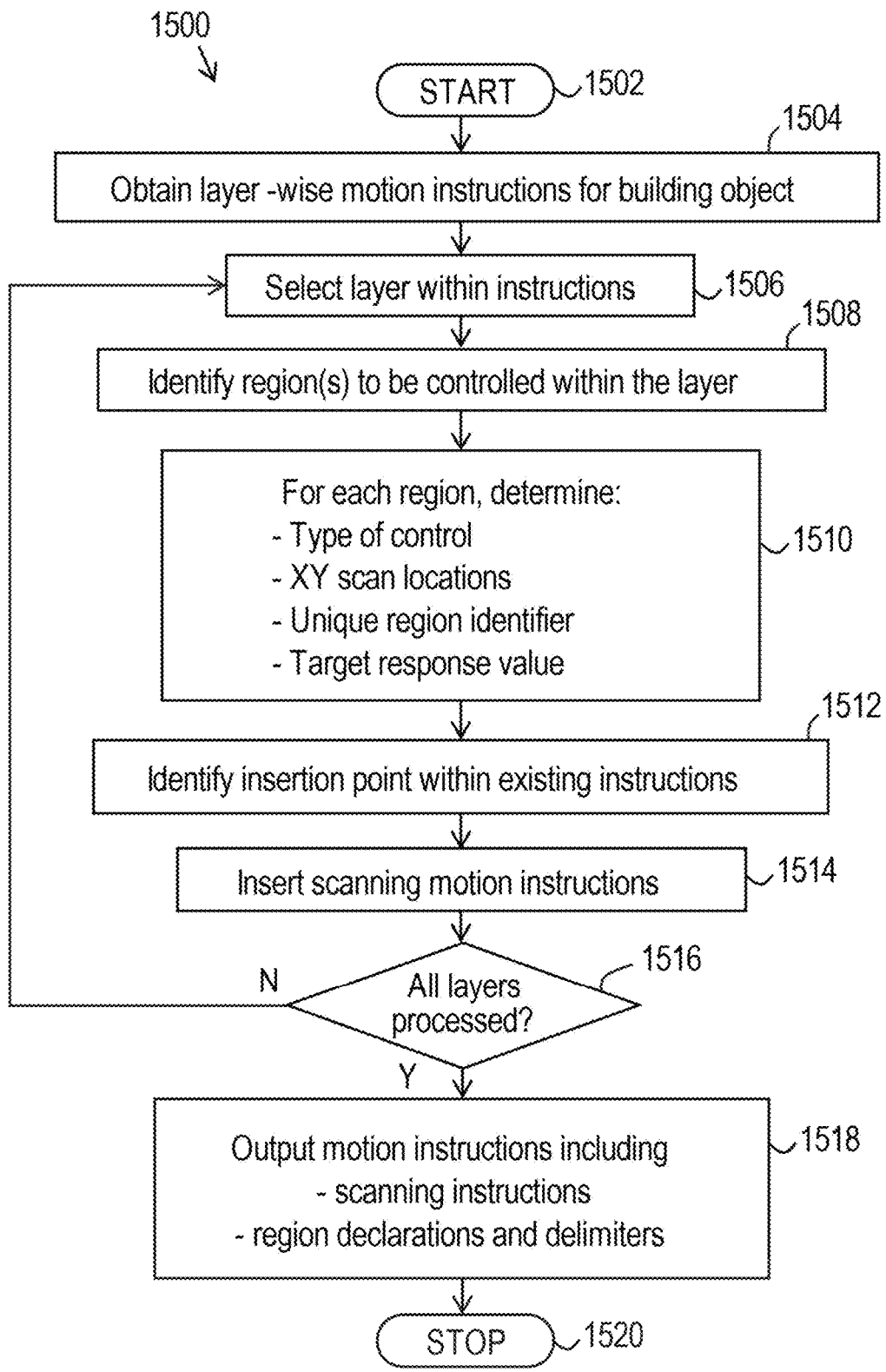
FIG. 15 is a flowchart of a process for preparing instructions to direct an extrusion deposition system to form a solid object, including instructions supporting closed-loop control of flow rate for multiple regions in accordance with example embodiments of the present teachings.

FIG. 15 shows a process 1500 involved with the preparation of instructions comparable to the upper half of FIG. 11 and more specifically in a context where multiple isolated regions are to be subject to independent closed-loop control of flow rate. Process 1500 commences in step 1502 upon receipt of a shape-describing file, such as shape model file 1102 as was shown in FIG. 11. Execution proceeds immediately to step 1504 wherein the shape model file may be converted into layer-wise motion instructions for building the object shape specified in the shape model file. In other words, in step 1504, specific nozzle toolpaths are calculated based upon the shape model file. These calculated toolpaths are eventually encoded as G-code instructions or in some other suitable format that expresses motion in multiple axes. Referring back to FIG. 11, this initial creation of layer-wise motion instructions may be performed within preparation environment 1110 and more specifically within slicer 1120. Step 1504 may create motion instructions layer-by-layer motion instructions for an entire build process. In contrast, step 1506 pertains to acting upon a subset of the motion instructions related to building a specific layer within the overall build process. The layer subset of instructions selected in step 1506 serve as a context for steps 1508 through 1514 that will now be described.

As mentioned before, it is possible for a given build layer to intersect the shape model in a way that creates multiple isolated regions as was shown in FIGS. 9A-9C. Step 1508 involves recognizing the presence of isolated regions and then step 1510 relates to determining, for each of the regions identified in step 1508, what type of control is applicable. For example, depending on user input that may be provided may have been provided through workstation 1112 shown in FIG. 11, the closed-loop control may be invoked to achieve 100% fill density or to control the height of perimeters only even as a sparse infill pattern may be used at the same time. As yet another alternative, it is possible that some regions may have been specified by a user to not be subject to closed-loop control at all. Another aspect in step 1510 relates to calculating or deciding where a distance scanning tool should sample the surface of the last printed layer. Refer to the earlier discussion as to selecting scan locations in alignment with an integer number of bead widths and as to the need to rotate a scanning tool to align with the lay of the deposited traces. A somewhat different logic for deciding scan locations may be applied when only perimeters are being sampled versus a solid infill. In particular, it has been observed that innermost perimeters of a multi-perimeter wall may need to be disregarded if sparse infill traces overlap the innermost perimeter, as is often the case. Another aspect of executing step 1510 involves assigning a unique identifier to each region that will persist throughout the build process. An example is shown in FIG. 12 wherein a declaration passage 1260 comprises line 1262 which sets forth a region identifier '021'.

Further down list 1250, delimiter line 1270 refers to region 1202 using identifier '021'. As explained earlier, an extrusion deposition system receiving instruction list 1250 may instantiate a CLCI data set 1182 responsive to reading passage 1260. As the system later encounters delimiter line 1270, the system may retrieve a particular region-specific flow rate from the appropriate CLCI data set and use that flow rate as it performs extrusion deposition according to instruction passage 1252. Furthermore, as the system collects data from executing scan passage 1254, the results of the scan are stored in data set 1182. Other fields in data set 1182 are then used to calculate a corrected flow rate to be used in subsequent layers that also have a region identified as '021'.

In step 1510, a target response value may be encoded based on user input provided through workstation 1112 or based on some automated decision process operating within preparation environment 1110. The target response value may be a function of layer heights as established during the time that the model file underwent slicing or otherwise was converted into toolpath data.

Still other data affiliated with closed-loop control of specific regions such as a layer range over which a region is to be active, may also be addressed in the course of executing step 1510. The layer range may form a part of a region declaration passage as was shown in passage 1216 FIG. 12.

Next, in step 1512, the appropriate insertion points within the G-code are determined for declaration passages (see 1260), delimiter passages (see 1270), and scanning motion instructions (see 1254). This action relates to the interlacing of these newly generated passages with the originally sliced passages 1252, 1256, 1259 observed in FIG. 12.

In step 1514, scanning motion instructions and other closed-loop control related comments or tags are inserted inline into the G-code as was depicted in FIG. 12. Next, in step 1516, a determination is made as to whether all layers that will be needed for the build have been reviewed and acted upon to deal with isolated regions according to steps 1508 through 1514. If, in step 1516, it is determined that not all layers have been processed, then execution returns to step 1506 to process another layer-wise set of instructions. On the other hand, if, in step 1516, it is determined that all layers have been processed then execution proceeds with step 1518 to output the motion instructions to include scanning instructions and any region declarations and delimiters. This output is represented in FIG. 11 by G-code file 1150. Thereafter, process 1500 concludes in step 1520.

Figure 16:
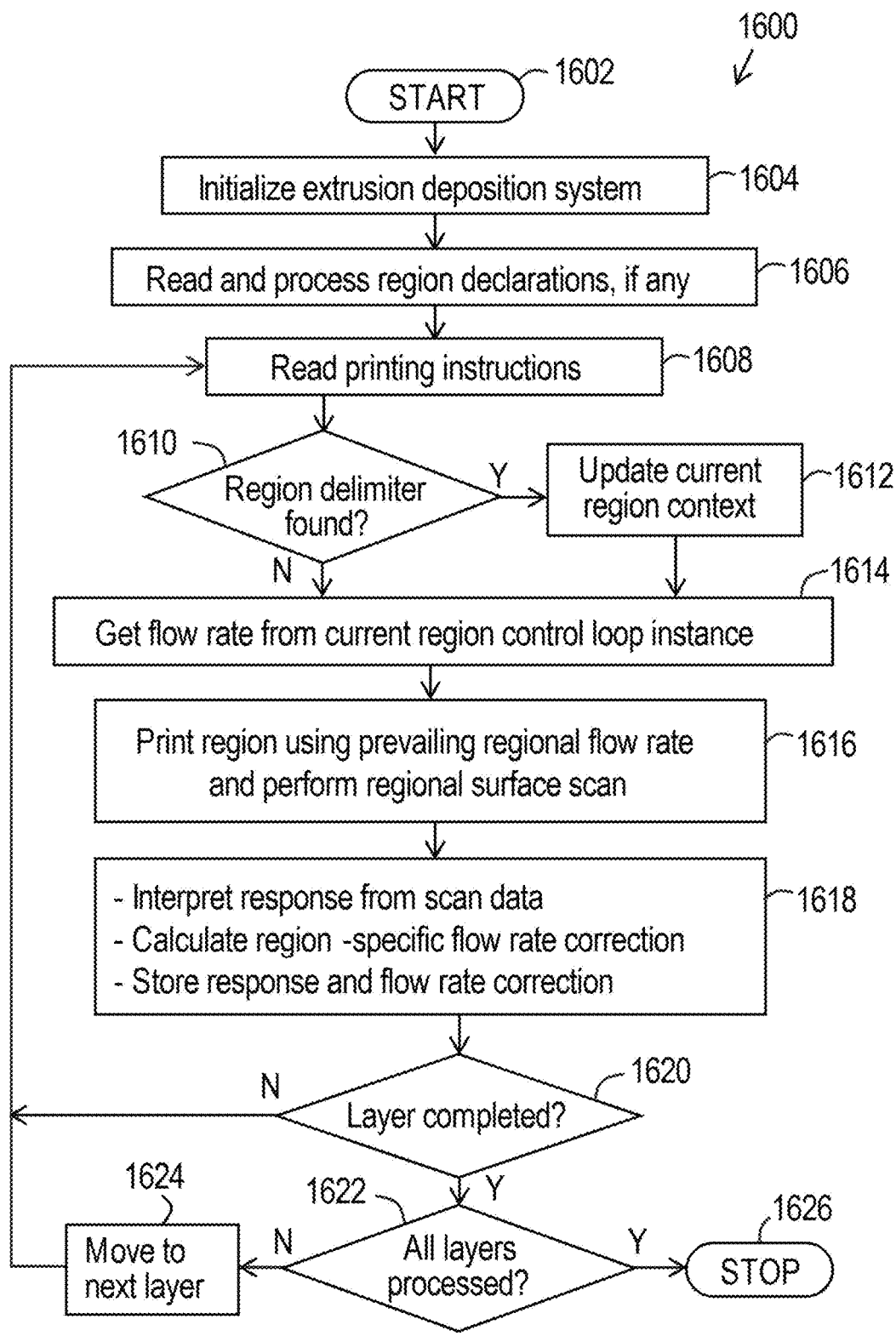
FIG. 16 is a flowchart of a process executed by an extrusion deposition system to form a solid object responsive to a set of instructions which includes instructions supporting closed-loop control of flow rate for multiple regions in accordance with example embodiments of the present teachings.

Whereas process 1500 operated in the realm of preparing instructions analogous to the top portion of FIG. 11, process 1600 shown in FIG. 16 operates within an extrusion deposition system in response to the embedded additional fields delimiters and metadata that were inserted into the G-code file by process 1500 to enable independent closed-loop control of flow rate for isolated regions. Process 1600 commences at step 1602 as a build process is being initiated for a particular object on extrusion deposition system 1190.

Execution immediately precedes to step 1604 for the general purpose of initializing the extrusion deposition system in the customary manner. This usually includes booting the computing platform of the system, loading raw materials as filament or pellets and preheating certain components such as heating elements involved with melting the material to be deposited as well as heated build surfaces. Next, in step 1606, as the G-code instructions are being read sequentially, the G-code instruction lines are analyzed for the presence of region declaration passages similar to passage 1260 shown in FIG. 12. Upon encountering such passages, system 1190 may create one or more CLCI data sets 1182 each being associated with an enumerated region. It is contemplated that region declarations may not only be placed at the outset of the G-code instruction list but may also be placed in line further in the body of the G-code and that the system 1190 might simply instantiate another CLCI data set whenever a new region identifier is encountered.

Step 1608 relates to generally reading the printing instructions the G-code instructions in sequence and step 1610 relates to reviewing each line of instruction to detect if a region delimiter, such as delimiter 1270, has been encountered. If an instruction line appears to be or contain a region delimiter then step 1610 directs execution to step 1612 to set the region identifier in the delimiter to be the 'current region' which establishes a context for interpreting subsequent instruction lines until a next region delimiter is found. The result of steps 1610 and 1612 are that either no new region delimiter is encountered and the 'current region' remains unchanged or a new region delimiter is encountered and becomes the new value for the 'current region'.

In either case, execution then continues at step 1614 to retrieve the latest flow rate from the CLCI data set associated with the current region. This action corresponds to the earlier description in which error processor 1185 accesses a specific one of the CLCI data sets 1182 and then provides a region-specific flow rate input 1184 to serve as a factor to be taken into account by extrusion multiplier 1171. Step 1616 is the action of printing using the retrieved flow rate. Referring briefly to FIG. 12, a region delimiter line 1270 may trigger the retrieval and invocation of a region-specific flow rate that becomes applicable as the extrusion deposition system deposits material according to G-code passage 1252. After following these deposition steps, scan passage 1254 will also be executed by the system and the data obtained from the scan will be applied to the same CLCI data set corresponding to region ID '021', given that no other region delimiters have been encountered since delimiter line 1270.

Next, in step 1618, the scan data obtained by the execution of step 1616 is interpreted to derive a value that is the response of the system in controlling the particular current region. For example, the scan data may be averaged to yield a single scalar value for the average distance as being the system response. Furthermore, in step 1618, a corrected flow rate value is calculated in a matter that has already been explained in conjunction with FIG. 14. This corrected flow rate value, as well as the system response value, are stored in the CLCI data set for the current region. Raw or interpreted scan data may also be stored for layers of an entire build so that it can be studied after the build for quality assurance purposes. In manufacturing fields such as aerospace or medicine, this data provides layer-by-layer traceability for an individual constructed part.

In step 1620 is determined whether the printing of a layer has been completed, which will generally be signified by comments embedded by a slicer and by the detection of upward increments along the Z axis. If it appears that there are more G-code movement instructions without having encountered one of these indications of a layer change, then step 1620 acts to return execution to step 1608, effectively continuing to read in instructions and process any region-specific handling necessary until the layer is completely printed, including all regions. If, in step 1620, it is determined that a layer is indeed complete, then execution proceeds to decision step 1622 to determine whether all layers in the build have been processed. If so, then process 1600 concludes at step 1626. Alternatively, if, in step 1622, it is determined that additional layers are indicated by the G-code, then execution proceeds to step 1624 to move to the next layer and then to perform step 1608 through 1620 for that next layer. The act of moving to the next layer relates to issuing a motion command that permanently increments the Z axis and may also involve lateral movements, extruder motor retractions and advances, initializing an extruder position register to zero, setting a feed rate for the layer, etc.

Figure 17A:
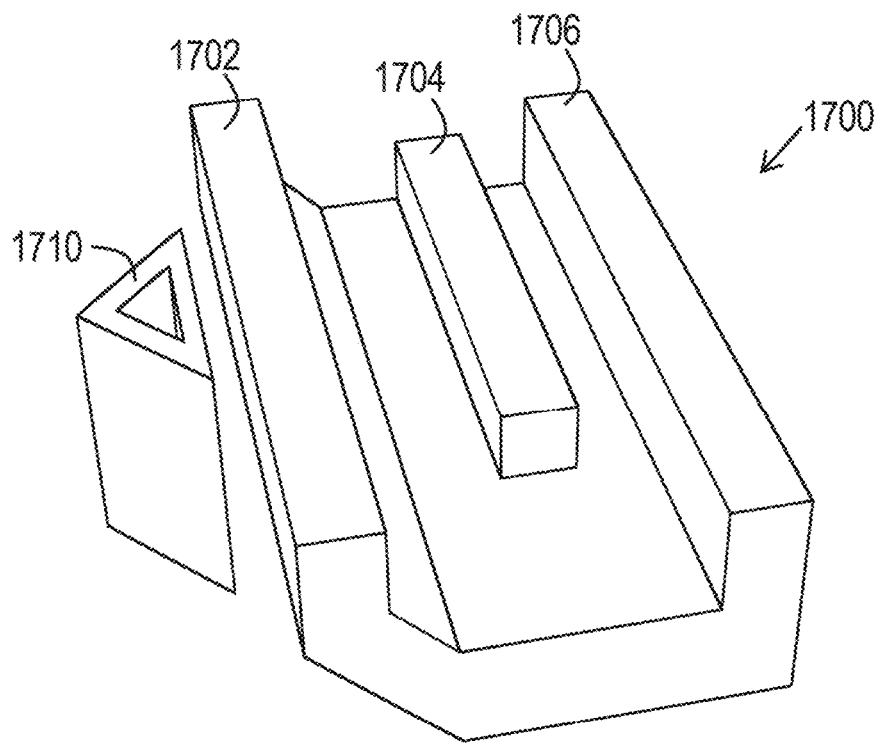
FIGS. 17A-17B depict the use of an auxiliary structure as a scanning reference in accordance with example embodiments of the present teachings.
Figure 17B:
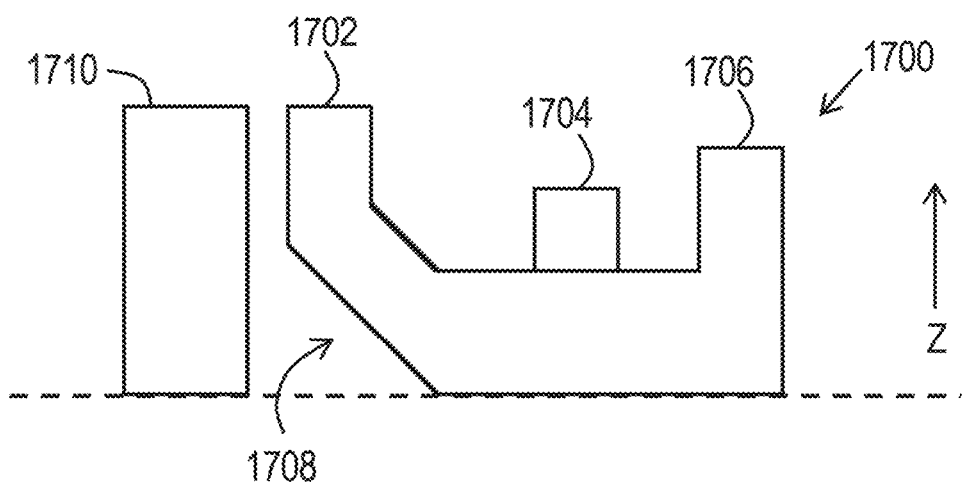

FIGS. 17A and 17B portray a situation in which an auxiliary structure is used as a reference for closed-loop control. FIG. 17A is a perspective view of a modeled part 1700 along with an auxiliary structure 1710. FIG. 17B shows a side view of the same modeled part 1700 and auxiliary structure 1710 so that relative heights are more apparent. Modeled part 1700 is shown to comprise elongated rails or walls 1702, 1704 and 1706. As evident in FIG. 17B, wall 1704 is shortest in the vertical direction or build direction, whereas wall 1702 is ultimately the tallest and wall 1706 is of intermediate height. In many situations, the build characteristics of isolated members within a model may be sufficiently similar that performing scanning and closed-loop control for one such member is adequate for controlling extrusion rates across the other members. In this case, walls 1702, 1704 and 1706 are of comparable size, shape and orientation and are therefore likely to respond similarly to a given flow rate. It is generally desirable to select a tallest member as a reference because it persists beyond the completion of shorter members and therefore avoids having to shift reference scanning locations mid-build, which could disrupt the control loop. In this scenario, although wall 1702 is ultimately the tallest structure, undercut face 1708 means that wall 1720 is effectively absent for the first part of the build and may be a less reliable gage of layer height even after face 1708 has been fully formed. To provide a more consistent layer height reference throughout the build, auxiliary structure 1710, shown in the form of a triangular tower, is depicted as being modeled and formed by the same extrusion process as for part 1700. As layers are deposited to build a part according to the shape of modeled part 1700, a tower according to the design of auxiliary structure 1710 is also formed by layered deposits and it is the latest, topmost layer of forming the tower that is scanned and assessed as in process 1400. Aside from this illustrative situation involving undercut face 1708, other part shapes or situations may motivate using an auxiliary structure as a reference for closed-loop control across numerous regions within a deposited layer.

As an additional refinement in practice, auxiliary structure 1710 may be formed as a series of adjacent outer perimeters, in the same manner as outer perimeters 902 shown in FIG. 9A. In particular, it has been found often advantageous for these perimeters to be deposited in the order of outermost to innermost. This ordering causes a cumulative lateral displacement effect that is very sensitive to even the slightest excess of flow. In other words, the outermost perimeter bounds the outward spreading of the first inner perimeter, then the now-inwardly-displaced first inner perimeter even further limits the deformation of the second inner perimeter, and so forth. As a result, when there is a very slight overfilling of each trace, the inner most perimeter stands taller than an ideally filled deposit would and the distance measurements described herein sense the protrusion of the innermost perimeter. This effect can be used to amplify the flow error signal and improve fine control when seeking 100% fill proportion.

In the preceding description, various principles and exemplary embodiments have been described with reference to the accompanying drawings. It will be evident, however, that various modifications and changes may be made thereto, and additional embodiments may be implemented, without departing from the scope of the invention as set forth in the claims that follow. The description and drawings are, therefore, to be regarded in an illustrative rather than a restrictive sense.

What is claimed is:

1. A method, in a robotic system for forming a solid object by depositing layers of an extruded material in a controlled pattern according to a digital model of the solid object, for controlling fill proportion of the layers being deposited comprising:
   for at least a portion of one first designed layer for which a fill proportion is to be controlled to a specific value, depositing, using a first flow rate expressed as a volume of discharge per unit of lateral motion, a plurality of adjacent discharges to form a first deposited layer of material in fulfillment of at least the first designed layer;
   performing at least one distance measurement on the first deposited layer to obtain observed profile data of the first deposited layer;
   from the profile data, calculating at least one difference value between an expected profile, according to the first designed layer, and the observed profile data;
   providing the at least one difference value as an argument to a control algorithm that determines a second flow rate that is offset from the first flow rate by at least a first factor times the at least one difference value and of a second factor times a cumulative value of difference values measured for multiple layers; and
   for at least a portion of one second designed layer for which a fill proportion is to be controlled, depositing, using the second flow rate of discharge per unit of lateral motion, a plurality of adjacent discharges to form a second deposited layer of material in fulfillment of the second designed layer;
   while forming the solid object, also depositing layers of the extruded material to form a height reference structure;

performing at least one distance measurement on the height reference structure to obtain observed profile data that is representative of the first deposited layer; and using the at least one distance measurement on the height reference structure in calculating the second flow rate of discharge per unit of lateral motion.

2. The method of claim 1 wherein the fill proportion is controlled to 100% fill density.

3. The method of claim 1 wherein the fill proportion is controlled to within a range selected from set of ranges containing 85% to 100%, 85% to 90%, 90% to 100%, 99% to 100%, and 99.9% to 100%.

4. The method of claim 1 wherein the distance measurement is performed using an optical distance measuring tool.

5. The method of claim 4 wherein the optical distance measuring tool employs a laser optical beam and measures with a resolution of 50 microns or less.

6. The method of claim 4 further comprising:
controlling a rotational orientation of the optical distance measuring tool to achieve orientation with respect to the first design layer that is suitable for performing the distance measurement.

7. A method, in a robotic system for forming a solid object by depositing layers of an extruded material in a controlled pattern according to a digital model of the solid object, for controlling fill proportion of the layers being deposited comprising:
for at least a portion of one first designed layer for which a fill proportion is to be controlled to a specific value, depositing, using a first flow rate expressed as a volume of discharge per unit of lateral motion, a plurality of adjacent discharges to form a first deposited layer of material in fulfillment of at least the first designed layer;
performing at least one distance measurement on the first deposited layer to obtain observed profile data of the first deposited layer;
from the profile data, calculating at least one difference value between an expected profile, according to the first designed layer, and the observed profile data;
providing the at least one difference value as an argument to a control algorithm that determines a second flow rate that is offset from the first flow rate by at least a first factor times the at least one difference value and of a second factor times a cumulative value of difference values measured for multiple layers; and
for at least a portion of one second designed layer for which a fill proportion is to be controlled, depositing, using the second flow rate of discharge per unit of lateral motion, a plurality of adjacent discharges to form a second deposited layer of material in fulfillment of the second designed layer;
wherein the at least one distance measurement is performed using an optical distance measuring tool;
controlling a rotational orientation of the optical distance measuring tool to achieve orientation with respect to the first design layer that is suitable for performing the at least one distance measurement;
providing a reference surface that, along an axis parallel to the distance measurement, remains at a fixed position compared to the optical distance measuring tool;
performing a calibration distance measurement corresponding to a specific rotational orientation; and
using the calibration distance measurement as a correction offset for at least one subsequent distance measurement performed while the optical distance measuring tool is at the specific rotational orientation.

8. A method, in a robotic system for forming a solid object by depositing layers of an extruded material in a controlled pattern according to a digital model of the solid object, for controlling a fill proportion of the layers being deposited comprising:
providing first digital model data describing shape information for the solid object to be constructed;
performing a slicing operation upon the first digital model data to calculate a plurality of layer slices and, for each layer slice, generating a list of build instructions for moving an extrusion nozzle to deposit material according to the shape information;
determining that a given layer slice comprises a first polygon and at least one second polygon that does not intersect the first polygon;
while depositing material to form the layer, maintaining instances of a first closed-loop data set pertaining to the first polygon and a second closed-loop data set pertaining to the second polygon;
obtaining first optical scan data by scanning material deposited in a shape according to the first polygon;
obtaining second optical scan data by scanning material deposited in a shape according to the second polygon;
calculating a first difference value by comparing the first optical scan data to a first target distance value and calculating a first flow rate correction value to be applied when the extruder deposits material at a location that overlaps the first polygon in at least one subsequent layer slice; and
calculating a second difference value by comparing the second optical scan data to a second target distance value and calculating a second flow rate correction value to be applied when the extruder deposits material at a location that overlaps the second polygon in at least one subsequent layer slice;
wherein the first closed-loop data set and the second closed-loop data set have different data values for at least one data field from the set of data fields consisting of: a distance between an optical scanner and the deposited material, a measured thickness of the deposited material, a target fill density, a closed loop control tolerance value, a number of extrude traces to be sampled, coordinates for sampling extruded traces, difference distance value, target distance value, flow rate correction value, a Kp coefficient to be multiplied by a difference distance value for calculating a flow rate correction value, a cumulative error value accumulated over multiple scanned layers and a Ki coefficient to be multiplied by the cumulative error value for calculating a flow rate correction value.

9. The method of claim 8 wherein the action of determining that the given layer slice comprises the first polygon and the at least one second polygon is performed during the slicing operation and wherein the maintaining instances of the first and second closed-loop data sets during the forming of the solid object is in response to said determining action.

10. The method of claim 8 further comprising:
detecting the presence of the first and second polygons during the slicing operation; and
providing, with the list of instructions generated during the slicing operation, an indication that the given layer slice comprises the first polygon and at least one second polygon.

11. The method of claim 8 wherein the determining that the given layer slice comprises the first polygon and the at least one second polygon is based on data from at least one of the group consisting of: analysis of first digital model data independently of the slicing operation, data from an external source explicitly identifying the presence of the polygons, and inferring the presence of the polygons from the list of build instructions generated by the slicing operation.

12. The method of claim 8 further comprising:
responsive to the determining that the given layer slice comprises the first polygon and the at least one second polygon, adding to the list of build instructions first additional instructions to move an optical distance measuring tool, near the layer and over the location of the first polygon, to obtain the first optical scan data and second additional instructions to move the optical distance measuring tool, near the layer and over the location of the second polygon, to obtain the second optical scan data.

* * * * *